(12) United States Patent
Kiyota et al.

(10) Patent No.: US 9,616,917 B2
(45) Date of Patent: Apr. 11, 2017

(54) WORM WHEEL AND ELECTRIC POWER STEERING APPARATUS

(71) Applicant: NSK LTD., Tokyo (JP)

(72) Inventors: Haruhiko Kiyota, Maebashi (JP); Takeshi Yamamoto, Maebashi (JP); Fumiaki Mitsuhashi, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 14/387,615

(22) PCT Filed: Feb. 24, 2014

(86) PCT No.: PCT/JP2014/054360
§ 371 (c)(1),
(2) Date: Sep. 24, 2014

(87) PCT Pub. No.: WO2014/129631
PCT Pub. Date: Aug. 28, 2014

(65) Prior Publication Data
US 2015/0345609 A1  Dec. 3, 2015

(30) Foreign Application Priority Data

Feb. 25, 2013 (JP) ................. 2013-034912
Feb. 25, 2013 (JP) ................. 2013-034913
Mar. 7, 2013  (JP) ................. 2013-045857

(51) Int. Cl.
*B62D 5/04* (2006.01)
*F16H 57/00* (2012.01)
(Continued)

(52) U.S. Cl.
CPC .......... *B62D 5/0409* (2013.01); *F16H 55/06* (2013.01); *F16H 55/22* (2013.01);
(Continued)

(58) Field of Classification Search
CPC .... F16H 55/06; F16H 55/22; F16H 2055/065; B62D 5/0409
(Continued)

(56) References Cited

U.S. PATENT DOCUMENTS

2007/0209864 A1\* 9/2007 Segawa ............... B62D 5/0409
180/446
2009/0050400 A1\* 2/2009 Segawa ............... B62D 5/0403
180/446
2012/0111144 A1  5/2012 Wakugawa

FOREIGN PATENT DOCUMENTS

CN  102510960 A  6/2012
EP  1614935 A1  1/2006
(Continued)

OTHER PUBLICATIONS

Communication from the Japanese Patent Office dated May 7, 2015 in a counterpart Japanese application No. 2014-168921.
(Continued)

*Primary Examiner* — Tony Winner
*Assistant Examiner* — Felicia L Brittman
(74) *Attorney, Agent, or Firm* — Sughrue Mion, PLLC

(57) ABSTRACT

A core of a worm wheel has an axial end surface formed with a first annular recess nad and another axial end surface formed with a second annular recess. An outer circumferential wall surface of a radially outer region of the second annular recess has a tapered surface extending from a bottom surface of the second annular recess to form an obtuse angle relative to the bottom surface, and a third annular recess formed radially outside the tapered surface. A cross-section of the third annular recess is a right-angled triangle having, as two sides, a surface parallel to the bottom surface of the second annular recess and a surface perpendicular to the bottom surface of the second annular recess. A rim portion has a first inner circumferential portion fixed
(Continued)

to the first annular recess and a second inner circumferential portion fixed to the second annular recess.

7 Claims, 27 Drawing Sheets

(51) Int. Cl.
 *F16H 55/06* (2006.01)
 *F16H 55/22* (2006.01)
(52) U.S. Cl.
 CPC ... *F16H 57/0006* (2013.01); *F16H 2055/065* (2013.01); *Y10T 74/19907* (2015.01); *Y10T 74/19921* (2015.01); *Y10T 74/19953* (2015.01)
(58) Field of Classification Search
 USPC ........................................................ 180/444
 See application file for complete search history.

(56) References Cited

FOREIGN PATENT DOCUMENTS

| GB | 2482927 A | 2/2012 |
|---|---|---|
| JP | 2000-329217 A | 11/2000 |
| JP | 2001-206230 A | 7/2001 |
| JP | 2002-054719 A | 2/2002 |
| JP | 2003-21223 A | 1/2003 |
| JP | 2004-34941 A | 2/2004 |
| JP | 2004-345573 A | 12/2004 |
| JP | 2004-360760 A | 12/2004 |
| JP | 2006-22883 A | 1/2006 |
| JP | 2006-218896 A | 8/2006 |
| JP | 2006218896 A * | 8/2006 |
| JP | 2007-210588 A | 8/2007 |
| JP | 2008-195108 A | 8/2008 |
| JP | 2009-127767 A | 6/2009 |
| JP | 2010-14253 A | 1/2010 |
| JP | 2011-202682 A | 10/2011 |
| WO | 2007/037499 A1 | 4/2007 |

OTHER PUBLICATIONS

Communication from the Japanese Patent Office dated May 7, 2015 in a counterpart Japanese application No. 2014-168922.
International Search Report for PCT/JP2014/054360 dated Apr. 8, 2014 [PCT/ISA/210].
Machine Translation of JP 2004-34941.
Communication dated May 30, 2016, from the State Intellectual Property Office of People's Republic of China in counterpart Application No. 201480001078.3.
Communication dated Sep. 28, 2016, issued by the European Patent Office in counterpart European application No. 14754948.9.

* cited by examiner

WORM WHEEL AND ELECTRIC POWER STEERING APPARATUS

TECHNICAL FIELD

The present invention relates to a worm wheel forming a speed reducer of an electric power steering apparatus.

BACKGROUND ART

An electric power steering apparatus, which is mounted in vehicles, such as automobiles, is adapted to transmit steering assistant power from an electric motor to a steering mechanism through a speed reducer, based on a steering torque. In an electric power steering apparatus using a worm gear mechanism as the speed reducer, a worm wheel on a steering shaft is engaged with a worm on a driving shaft of the electric motor.

Such a worm wheel has a structure in which an outer circumference of a core made of metal is typically covered with a rim portion made of synthetic resin to reduce collision noise (rattling noise) between meshed teeth due to backlash relative to the worm (see, e.g., Patent Documents 1 to 3).

FIG. 27 illustrates a conventional example of a worm wheel. The worm wheel 100 has a core 100 made of metal and a substantially annular rim portion 201 covering an outer circumferential portion of the core 101. The core 101 is formed in a substantially circular disk shape, and has a center hole 11 into which a shaft is fitted, and an axial end surface formed with a first annular recess 12. A spline 15a is formed on the outer circumferential portion of the core 101.

The rim portion 201 is integrally formed with the core 101 by synthetic resin injection molding. A gear 21 is formed on an outer circumferential portion of the rim portion 201. The rim portion 201 has a first inner circumferential portion 22 fixed to the first annular recess 12 of the core 101 and a second inner circumferential portion 230 fixed to the other axial end surface of the core 101. The first inner circumferential portion 22 extends from one axial end surface of the rim portion 201 to a radially outer region (an outer circumferential wall surface 12a and a radially outer portion 12b of a bottom surface) of the first annular recess 12 and fixed to the outer circumferential wall surface 12a and the radially outer portion 12b of the bottom surface.

Also, the rim portion 201 has a protrusion engaged with a valley of the spline 15a of the core 101. By such an engagement of the protrusion of the rim portion 201 with the valley of the spline 15a of the core 101, the rim portion 201 and the core 101 are coupled to each other to be integrally rotated and thus to allow a torque to be transmitted therebetween.

PRIOR ART DOCUMENT

Patent Document 1: JP 2004-34941 A
Patent Document 2: JP 2004-345573 A
Patent Document 3: JP 2006-22883 A

SUMMARY OF INVENTION

Problem to be Solved by Invention

When an electric power steering is used in large automobiles, the assistant torque applied to an output shaft through the worm wheel is increased. When the assistant torque is applied to the output shaft through the worm wheel, a moment M in a tilting direction as shown in FIG. 27 is exerted on the worm wheel from meshed portions between the worm wheel and the worm. In such a conventional worm wheel, there is room for improvement in increasing the coupling strength between the core bar 101 and the rim portion 201 against the moment M.

An object of the present invention is to provide a worm wheel, in which an outer circumference of a core made of metal is covered with a rim portion made of synthetic resin, and coupling strength between the core and the rim portion is increased as compared to a conventional product.

Means for Solving the Problem

According to an aspect of the present invention, a worm wheel includes a substantially disk-shaped core made of metal, and a substantially annular rim portion made of synthetic resin and covering an outer circumferential portion of the core. A gear is formed on an outer circumferential portion of the rim portion. The rim portion is integrally formed with the core by synthetic resin injection molding.

The core includes a center hole into which a shaft is fitted, an axial end surface formed with a first annular recess, and another axial end surface formed with a second annular recess.

An outer circumferential wall surface of a radially outer region of the second annular recess has a tapered surface extending from a bottom surface of the second annular recess to form an obtuse angle relative to the bottom surface, and a third annular recess formed radially outside the tapered surface, a cross-sectional shape of the third annular recess being a right-angled triangle having, as two sides of the triangle, a surface parallel to the bottom surface of the second annular recess and a surface perpendicular to the bottom surface of the second annular recess.

The rim portion includes a first inner circumference extending from an axial end surface of the rim portion to a radially outer region of the first annular recess (an outer circumferential wall surface of the first annular recess and a radially outer portion of a bottom surface thereof) and fixed to the radially outer region of the first annular recess, and a second inner circumference extending from another axial end surface of the rim portion to the radially outer region of the second annular recess (the tapered surface and the third annular recess forming the outer circumferential wall surface of the second annular recess, and a radially outer portion of the bottom surface thereof) and fixed to the radially outer region of the second annular recess.

The rim portion is injection-molded in a state in which the core is arranged in a mold such that the second annular recess faces a gate and such that an axial direction of a sprue and an axial direction of the core are aligned with each other.

According to this worm wheel, the second annular recess, in addition to the first annular recess, is formed on the core, and a fixation of the second inner circumference of the rim portion to the second annular recess, in addition to a fixation of the first inner circumference of the rim portion to the first annular recess, is achieved, and thus the coupling strength between the core and the rim portion is higher than that of a conventional worm wheel.

In addition, because the second annular recess has the above shape, the coupling strength between the core and the rim portion can be further increased as compared to a worm wheel not having the above shape, and at the same time, a flow of the resin is less disturbed during injection molding, and therefore occurrence of a weld line or the like, which is a cause of decreasing in strength of the rim portion, is prevented.

A depth of the second annular recess is preferably at least 0.1 mm but not deeper than half of a gate thickness, and more preferably set to 0.5 mm or more and 3.0 mm or less.

Preferably, the other axial end surface of the core includes end surface portions between which, in a radial direction, the second annular recess is disposed, and each of the end surface portions is a flat surface, and preferably, the flat surfaces forming the respective end surface portions are arranged on a same plane.

Preferably, the rim portion is formed by injection molding using a disk gate.

The worm wheel is suitable as a worm wheel forming a speed reducer for an electric power steering apparatus, in which a power of an electric motor is transmitted to a steering mechanism to assist steering.

Effects of Invention

According to the worm wheel of the present invention, coupling strength between the core and the rim portion is higher than that of a conventional worm wheel.

EMBODIMENTS OF INVENTION

Embodiments of the present invention will be now described, but the invention is not limited to the following embodiments.

Figure 1:
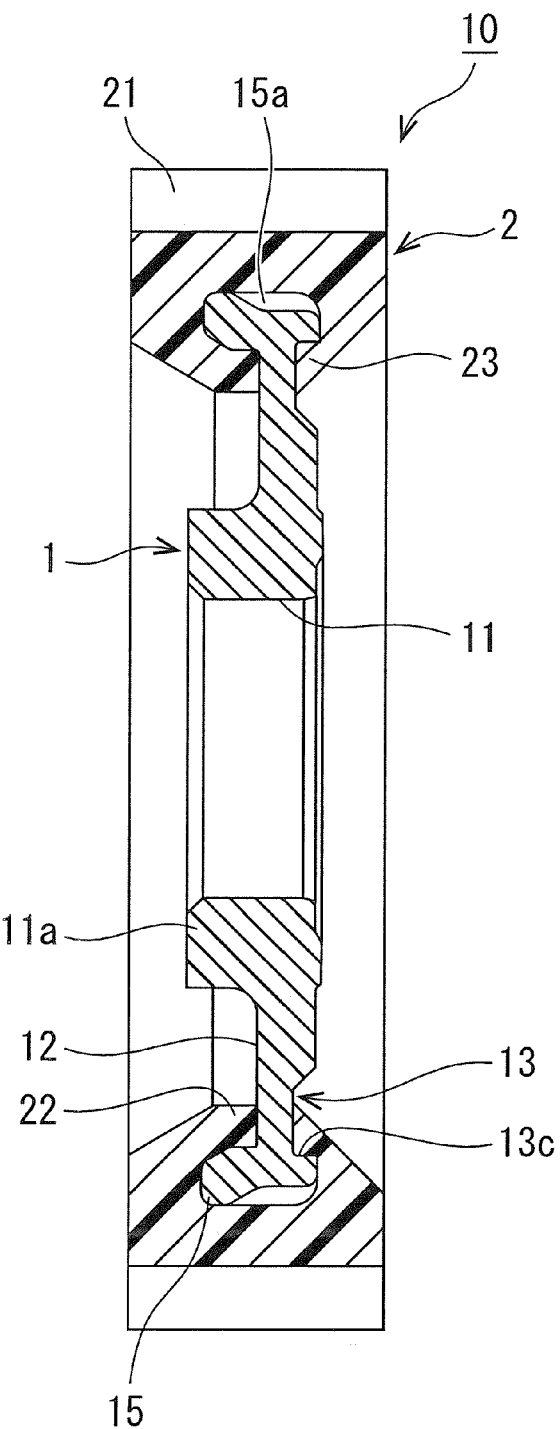
FIG. 1 is a sectional view showing a worm wheel according to a first embodiment of the present invention.

Now, a first embodiment of the present invention will be described. FIG. 1 is a sectional view showing a worm wheel according to the first embodiment, and FIG. 2 is an enlarged view showing a part thereof.

Figure 2:
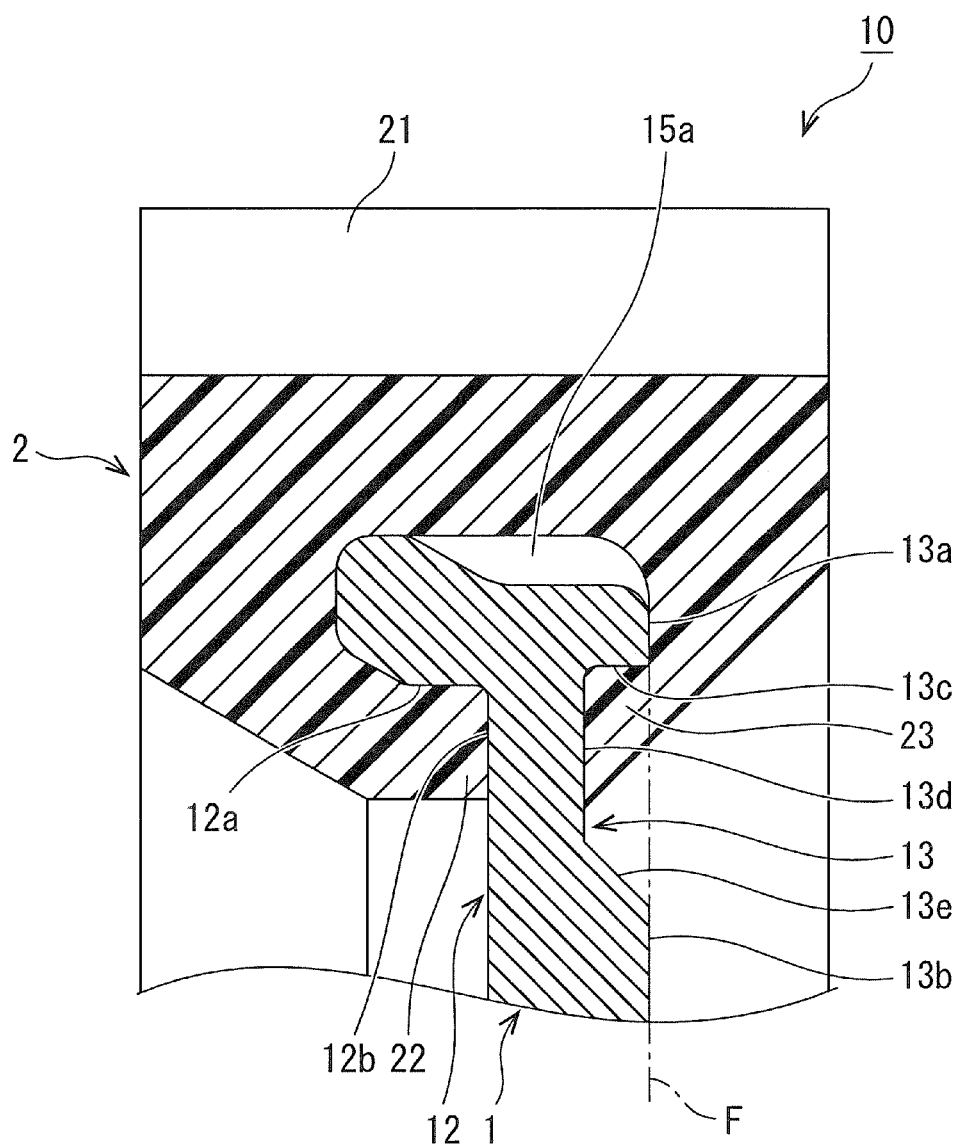
FIG. 2 is an enlarged view showing a part of FIG. 1.

As shown in FIGS. 1 and 2, the worm wheel 10 of the first embodiment has a core 1 made of metal and a substantially annular rim portion 2 covering an outer circumference 15 of the core 1. The core 1 is arranged on the substantially center of the rim portion 2, as viewed in an axial direction thereof.

The core 1 is formed in a substantially circular disk shape. The core 1 has a center hole 11, into which a shaft is fitted, one axial end surface having a first annular recess 12 formed thereon, the other axial end surface having a second annular recess 13 formed thereon, and the outer circumference 15 having a spline 15a formed thereon. As viewed in an axial direction, the spline 15a is provided on a part of the outer circumference 15, on the side of which the second annular recess 13 is formed. The other part of the outer circumference 15, on the side of which the first annular recess 12 is formed, is configured as a cylindrical surface. A part of the core 1, which is located more radially inward than the first annular recess 12, becomes a boss portion 11a having the center hole 11.

As shown in FIG. 2, the other axial end surface of the core 1 has end surface portions 13a, 13b, between which the second annular recess 13 is located as viewed in a radial direction thereof. The end surface portion 13a, 13b are a flat surface and are arranged on the same plane as shown by a one-dot chain line F. The second annular recess 13 has a bottom surface 13d, an outer circumferential wall surface 13c extending in the axial direction from the bottom surface 13d to be perpendicular to the bottom surface 13d, and an inner circumferential wall surface 13e extending from the bottom surface 13d toward the end surface portion 13b in a tapered shape to form an obtuse angle relative to the bottom surface 13d. The outer circumferential wall surface 13c of the second annular recess 13 is configured as a cylindrical surface. An outer circumferential wall surface 12a of the first annular recess 12 is configured as a cylindrical surface having a diameter smaller than that of the outer circumferential wall surface 13c of the second annular recess 13. Namely, the outer circumferential wall surface 13c of the second annular recess 13 is provided more radially outward than the outer circumferential wall surface 12a of the first annular recess 12.

The rim portion 2 is integrally formed with the core 1 by injection molding of synthetic resin. A gear 21 is formed on an outer circumferential portion of the rim portion 2. The rim portion 2 has a first inner circumferential portion 22 fixed to the first annular recess 12 of the core 1 and a second inner circumferential portion 23 fixed to the second annular recess 13.

As shown in FIG. 2, the first inner circumferential portion 22 extends from one axial end surface of the rim portion 2 to a radially outer region of the first annular recess 12 and is fixed to the outer circumferential wall surface 12a of the first annular recess 12 and a radially outer portion 12b of a bottom surface of the first annular recess 12. An inner circumferential surface of the first inner circumferential portion 12 has a cylindrical surface abutted against the radially outer portion 12b of the bottom surface of the first annular recess 12 and an inclined surface extending radially outward from the cylindrical surface toward the one axial end surface of the rim portion 2. The second inner circumferential portion 23 extends from the other axial end surface of the rim portion 2 to a radially outer region of the second annular recess 13 and is fixed to the outer circumferential wall surface 13c of the second annular recess 13 and a radially outer portion of the bottom surface 13d of the second annular recess 13. An inner circumferential surface of the second inner circumferential portion 23 is configured as an inclined surface extending radially outward from the bottom surface 13d of the second annular recess 13 toward the other axial end surface of the rim portion 2 (see a line L in FIG. 4). A radial position, at which the inner circumferential surface of the first inner circumferential portion 22 is abutted against the radially outer portion 12b of the bottom surface of the first annular recess 12, is approximately equal to a radial position, at which the inner circumferential surface of the second inner circumferential portion 23 is abutted against the bottom surface 13d of the second annular recess 13.

The rim portion 2 has a protrusion engaged with a valley of the spline 15a of the core 1. By such an engagement of the protrusion of the rim portion 2 with the valley of the spline 15a of the core 1, the rim portion 2 and the core 1 are coupled to each other to be integrally rotated and thus to allow a torque to be transmitted therebetween.

The worm wheel 10 is manufactured according to the following method.

Figure 3:
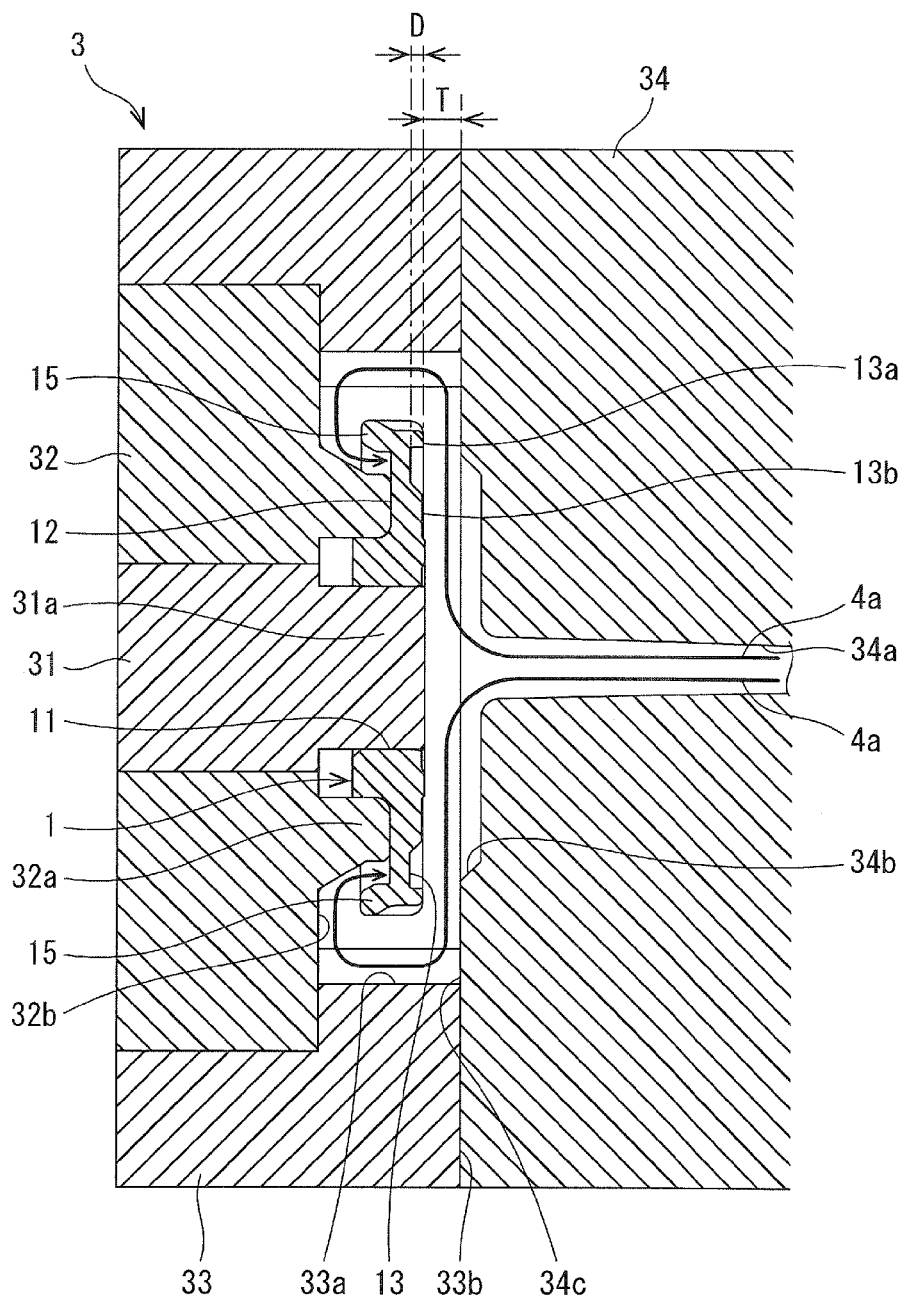
FIG. 3 is a view explaining a mold used in injection molding for manufacturing the worm wheel of the first embodiment, and a flow of a synthetic resin during injection molding.

As shown in FIG. 3, a mold 3 used in injection molding has a first member 31, a second member 32, a third member 33, and a fourth member 34. The first member 31 has a protrusion 31a adapted to be fitted in the center hole 11 of the core 1. The second member 32 has a protrusion 32a adapted to be fitted in the first annular recess 12 and a recessed portion 32b forming a cavity. The third member 33 has a recessed portion 33a forming the cavity and a parting surface 33b. The fourth member 34a has a sprue 34a, a recessed portion 34b forming a disk gate, and a parting surface 34c.

First, the core 1, which is made of metal, is manufactured by a conventionally known method. At this time, a depth D of the second annular recess 12 is in a range of 0.5 mm to half of a gate thickness T. In addition, even when the gate thickness T is 6.0 mm or more, the depth D of the second annular recess 12 is set to 3.0 mm or less.

Then, the core 1 is arranged in the mold 3 such that the second annular recess 13 faces the gate and such that an axial direction of the sprue 34a and the axial direction of the core 1 are aligned with each other. At this time, an inclined inner circumferential surface of the recessed portion 34b forming the disk gate faces the inner circumferential wall surface 13e of the second annular recess 13 of the core 1 (they are at substantially the same radial position, and is parallel to the inner circumferential wall surface 13e of the second annular recess 13 of the core 1. Then, by operating an injection molding machine, the rim portion 2 is integrally molded with the core 1.

At this time, a synthetic resin, which is supplied from a nozzle of the injection molding machine, is introduced from the sprue 34a into the cavity through the disk gate. As shown by a line 4a in FIG. 3, the synthetic resin goes around from the other axial end surface (surface having the second annular recess 13 formed thereon) of the core 1 into the one axial end surface thereof (surface having the first annular recess 12 formed thereon) through the outside of the outer circumference 15.

Figure 4:
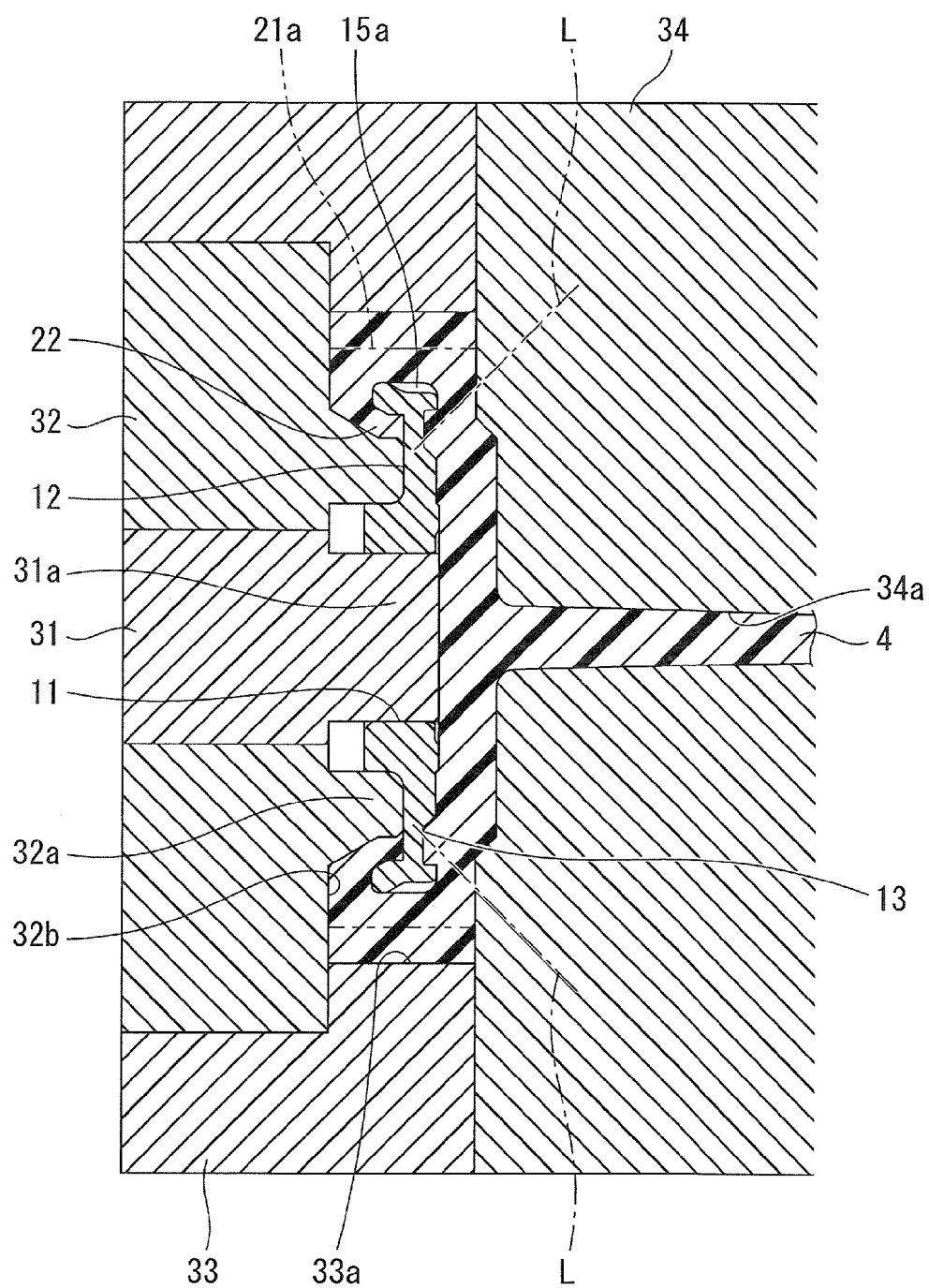
FIG. 4 is a view explaining a method of manufacturing the worm wheel of the first embodiment, showing a state where the synthetic resin is filled and solidified in the mold by injection molding.

FIG. 4 shows a state where the synthetic resin 4 is filled in the mold by injection molding and then the synthetic resin 4 is solidified. After the mold 3 is removed in such a state, the synthetic resin 4 is separated in a cone shape along a line L, thereby obtaining the worm wheel 10 shown FIG. 1. A line 21a in FIG. 4 is a line representing a valley of the gear 21.

In the first embodiment, a relationship of the depth D of the second annular recess 13 of the core 1 and the gate thickness T satisfies D≤T/2 (namely, the depth D of the second annular recess 13 of the core 1 is not deeper than half of an axial distance between the other axial end surface of the core 1 and the end surface portion 13a (the other axial end surface) of the rim portion 2), and the end surface portions 13a, 13b, between which the second annular recess 13 is disposed, are arranged on the same plane F. Therefore, a flow of the synthetic resin is hardly disturbed during injection molding of the synthetic resin. Namely, in the case where the depth D of the second annular recess 13 is as small as possible, swirling is hardly occurred when the synthetic resin flows. Also, if the end surface portions 13a, 13b between which the second annular recess 13 is disposed are not arranged on the same plane, swirling is easily occurred when the synthetic resin flows, thereby reducing strength of the synthetic resin. However, according to the present embodiment, because the end surface portions 13a, 13b between which the second annular recess 13 is disposed are arranged on the same plane F, the synthetic resin can be smoothly flowed. Therefore, the synthetic resin is clearly expanded over the whole of the cavity (up to the first annular recess 12, which is a terminal part of the flow), thereby preventing occurrence of a weld line or the like which is a cause of decreasing in coupling strength between the core 1 and the rim portion 2.

The worm wheel 10 includes the second annular recess 13 as well as the first annular recess 12 formed on the core 1, and has a fixation of the second inner circumferential portion 23 of the rim portion 2 to the second annular recess 12, in addition to a fixation of the first inner circumferential portion 22 of the rim portion 2 to the first annular recess 12. Thus, coupling strength between the core 1 and the rim portion 2 is higher than that of a worm wheel 100 in FIG. 27. Also, because the outer circumferential wall surface 13c of the second annular recess 13 extends from the bottom surface 13d to be perpendicular to the bottom surface 13d, the worm wheel 10 can be made to have a further increased coupling strength between the core 1 and the rim portion 2, as compared to a configuration in which the wall surface 13c is a tapered surface.

In addition, although the worm wheel 10 according to the first embodiment is provided with only one second annular recess 13 on the axial end surface of the core 1, when the depth D of the second annular recess 12 cannot be set to be 0.5 mm or more, a plurality of second annular recesses 12, which have a depth D of 0.1 mm or more and 0.4 mm or less, may be provided on the axial end surface of the core 1, thereby increasing in coupling strength between the core 1 and the rim portion 2. To ensure coupling strength between the core 1 and the rim portion 2, a lower threshold of D is set to 0.1 mm.

The worm wheel 10 is used in a speed reducer for a worm gear mechanism of an electric power steering apparatus.

Figure 5:
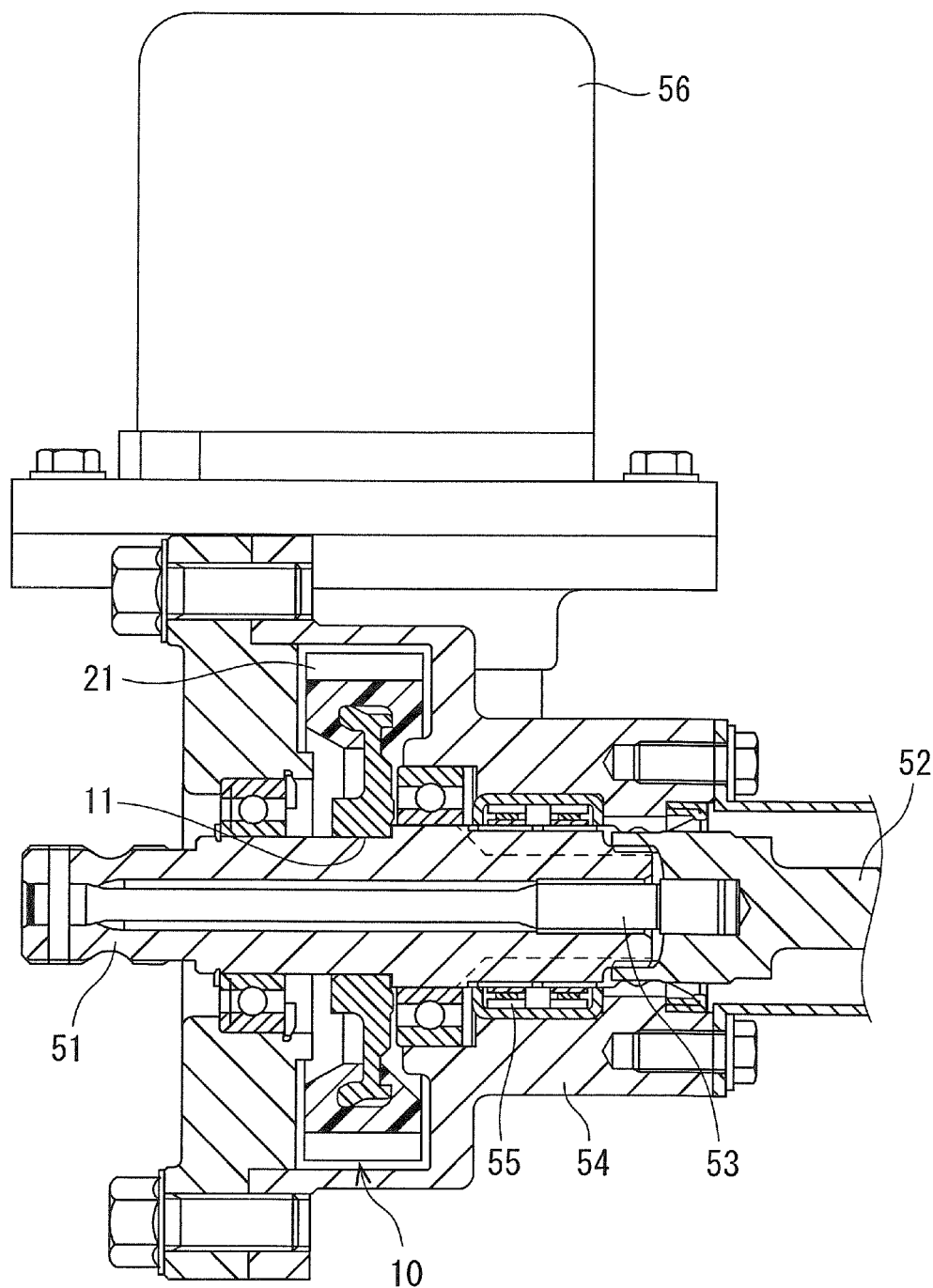
FIG. 5 is a sectional view showing a state where the worm wheel of the first embodiment is attached to a speed reducer for an electric power steering apparatus.
Figure 6:
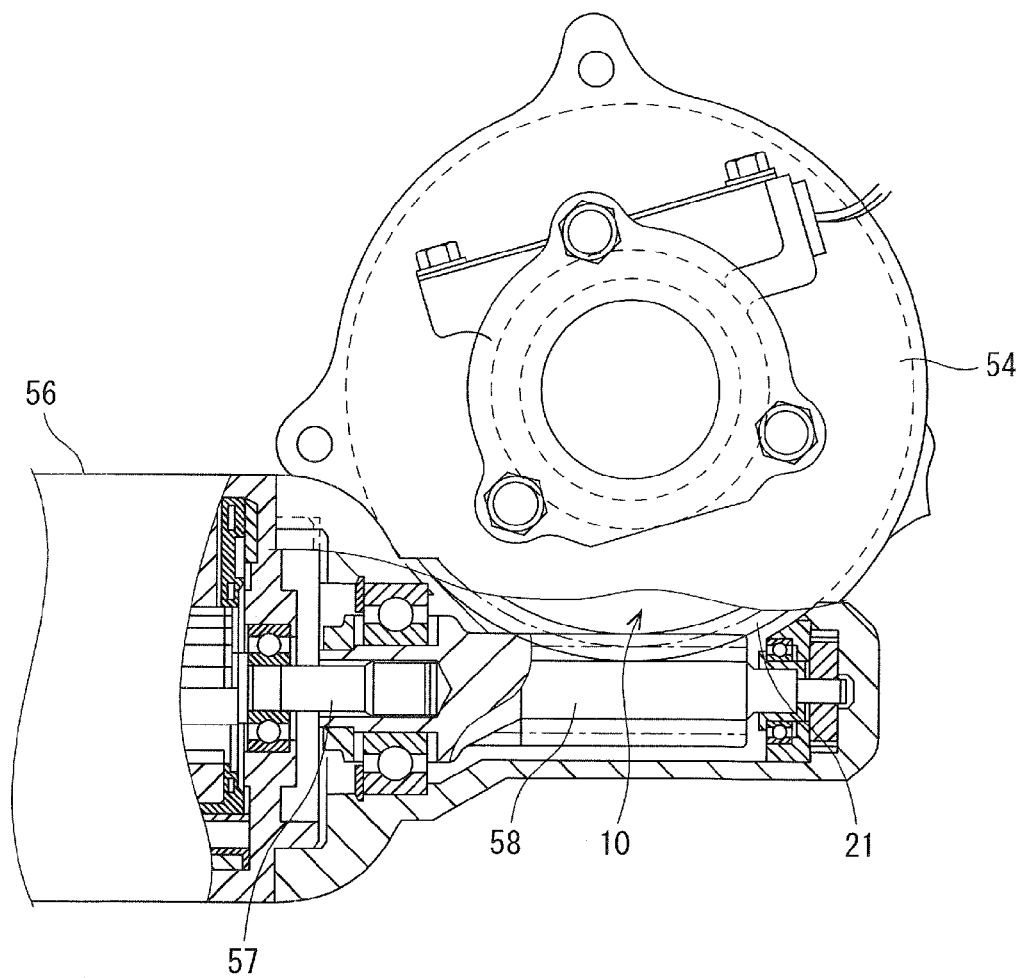
FIG. 6 is a view explaining a worm gear mechanism forming the speed reducer of FIG. 5.

FIG. 5 shows the electric power steering apparatus having the speed reducer, into which the worm wheel 10 is incorporated. FIG. 6 is a view explaining the speed reducer worm gear mechanism in FIG. 5.

In this example, an output shaft 51 and a steering shaft 52 in a steering mechanism for the electric power steering apparatus are coupled to each other by a torsion bar 53. A torque sensor 55 is installed on an inner surface of a housing 54 rotatably supporting the output shaft 51. The torque sensor 55 measures a torque transmitted between the steering shaft 52 and the output shaft 51.

As shown in FIG. 6, a worm 58 is coupled on an output shaft 57 of an electric motor 56. The gear 21 of the worm wheel 10 is engaged with the worm 58.

According to the electric power steering apparatus, an electric current is supplied to the electric motor 56 based on a torque value measured by the torque sensor 55, and thus an appropriate assistant torque is applied to the output shaft 51 through the speed reducer including the worm 57 and the worm wheel 10.

Figure 7:
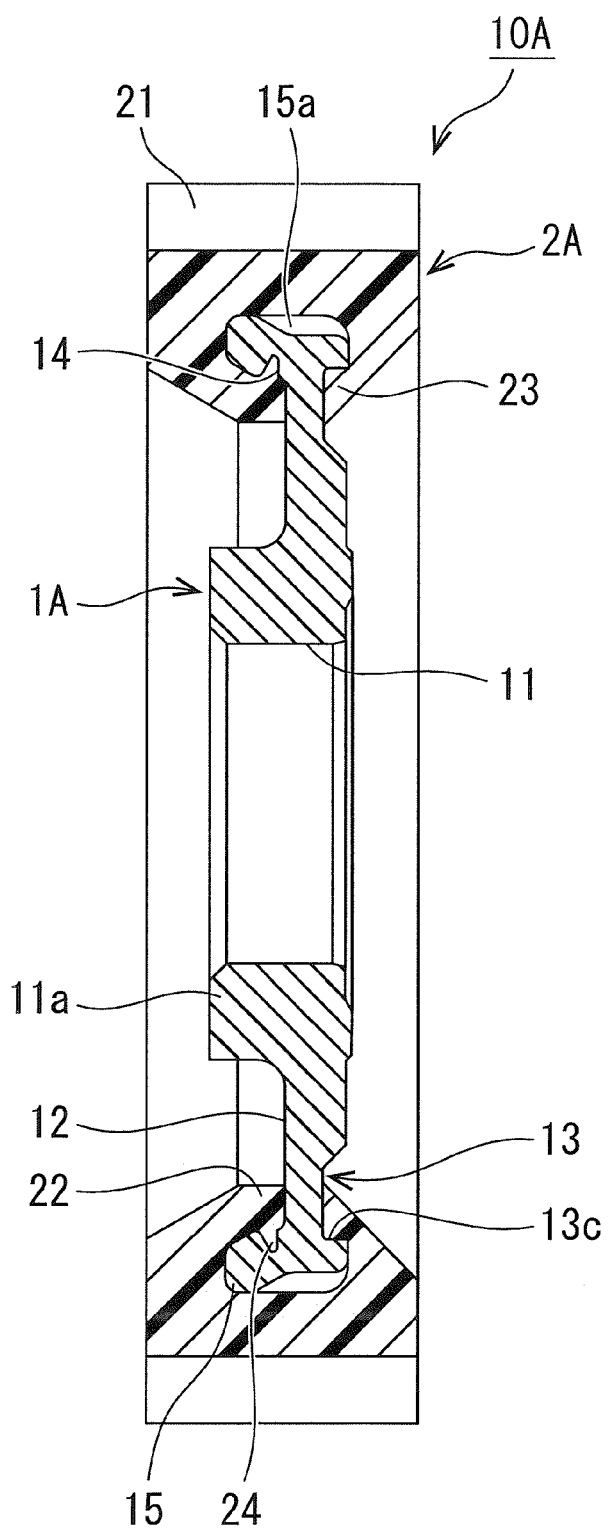
FIG. 7 is a sectional view showing a worm wheel according to a second embodiment of the invention.

Next, a second embodiment of the present invention will be described. FIG. 7 is a sectional view showing a worm wheel according to the second embodiment, and FIG. 8 is an enlarged view showing a part thereof.

Figure 8:
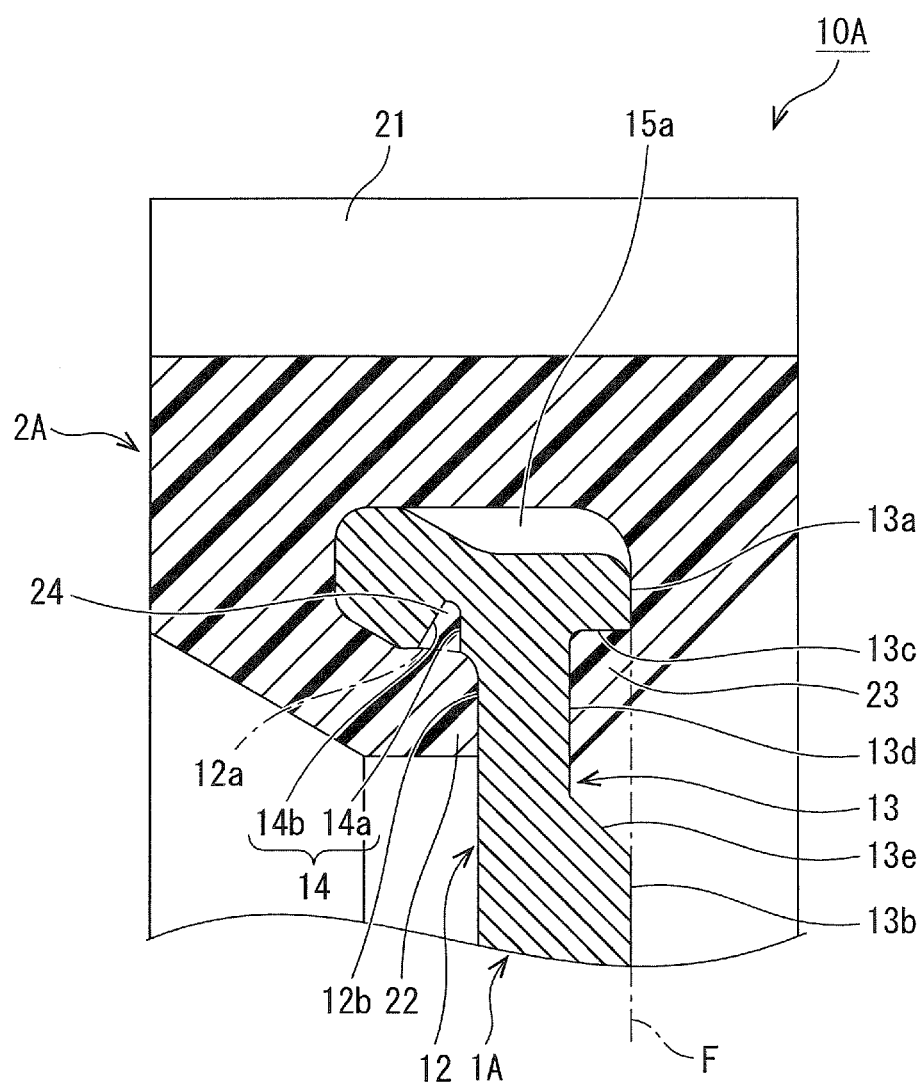
FIG. 8 is an enlarged view showing a part of FIG. 7.

As shown in FIGS. 7 and 8, the worm wheel 10A of the second embodiment has a core 1A made of metal and a substantially annular rim portion 2A covering an outer circumference 15 of the core 1A. The core 1A is arranged on the substantially center of the rim portion 2A, as viewed in an axial direction thereof.

The core 1A is formed in a substantially circular disk shape. The core 1A has a center hole 11, into which a shaft is fitted, one axial end surface having a first annular recess 12 formed thereon, the other axial end surface having a second annular recess 13 formed thereon, a third annular recess 14 formed on an outer circumferential wall surface (surface located in a radially outer region) 12a of the first annular recess 12, and a spline 15a formed on the outer circumference 15. As viewed in an axial direction, the spline 15a is provided on a part of the outer circumference 15, on the side of which the second annular recess 13 is formed.

The other part of the outer circumference 15, on the side of which the first annular recess 12 is formed, is configured as a cylindrical surface. A part of the core 1A, which is located more radially inward than the first annular recess 12, becomes a boss portion 11a having the center hole 11.

As shown in FIG. 8, the other axial end surface of the core 1A has end surface portions 13a, 13b, between which the second annular recess 13 is located as viewed in a radial direction thereof. The end surface portions 13a, 13b are flat surfaces and are arranged on the same plane as shown by a one-dot chain line F. The second annular recess 13 has a bottom surface 13d, an outer circumferential wall surface 13c extending in the axial direction from the bottom surface 13d to be perpendicular to the bottom surface 13d, and an inner circumferential wall surface 13e extending from the bottom surface 13d toward the end surface portion 13b in a tapered shape to form an obtuse angle relative to the bottom surface 13d. The outer circumferential wall surface 13c of the second annular recess 13 is configured as a cylindrical surface. A part of the outer circumferential wall surface 12a of the first annular recess 12 except the third annular recess 14 is configured as a cylindrical surface having a diameter smaller than that of the outer circumferential wall surface 13c of the second annular recess 13. Namely, the outer circumferential wall surface 13c of the second annular recess 13 is provided more radially outward than the part of the outer circumferential wall surface 12a of the first annular recess 12 except the third annular recess 14.

The third annular recess 14, as shown in FIG. 8, has a radial surface 14a extending in a direction approximately equal to a radial direction of the core 1A and a tapered surface 14b configured to be expanded on an opening side of the third annular recess 14.

The rim portion 2A is integrally formed with the core 1A by injection molding of synthetic resin. A gear 21 is formed on an outer circumferential portion of the rim portion 2A. The rim portion 2A has a first inner circumferential portion 22 fixed to the first annular recess 12 of the core 1A, a second inner circumferential portion 23 fixed to the second annular recess 13, and a protrusion 24 engaged with the third annular recess 14.

As shown in FIG. 8, the first inner circumferential portion 22 extends from one axial end surface of the rim portion 2A to a radially outer region of the first annular recess 12 and is fixed to the outer circumferential wall surface 12a of the first annular recess 12 and a radially outer portion 12b of a bottom surface of the first annular recess 12. An inner circumferential surface of the first inner circumferential portion 12 has a cylindrical surface abutted against the radially outer portion 12b of the bottom surface of the first annular recess 12 and an inclined surface extending radially outward from the cylindrical surface toward the one axial end surface of the rim portion 2A. The second inner circumferential portion 23 extends from the other axial end surface of the rim portion 2A to a radially outer region of the second annular recess 13 and is fixed to the outer circumferential wall surface 13c of the second annular recess 13 and a radially outer portion of the bottom surface 13d of the second annular recess 13. An inner circumferential surface of the second inner circumferential portion 23 is configured as an inclined surface extending radially outward from the bottom surface 13d of the second annular recess 13 toward the other axial end surface of the rim portion 2A (see a line L in FIG. 10). A radial position, at which the inner circumferential surface of the first inner circumferential portion 22 is abutted against the radially outer portion 12b of the bottom surface of the first annular recess 12, is approximately equal to a radial position, at which the inner circumferential surface of the second inner circumferential portion 23 is abutted against the bottom surface 13*d* of the second annular recess 13.

The rim portion 2A has a protrusion engaged with a valley of the spline 15*a* of the core 1A. By such an engagement of the protrusion of the rim portion 2A with the valley of the spline 15*a* of the core 1A, the rim portion 2A and the core 1A are coupled to each other to be integrally rotated and thus to allow a torque to be transmitted therebetween.

The worm wheel 10A is manufactured according to the following method.

Figure 9:
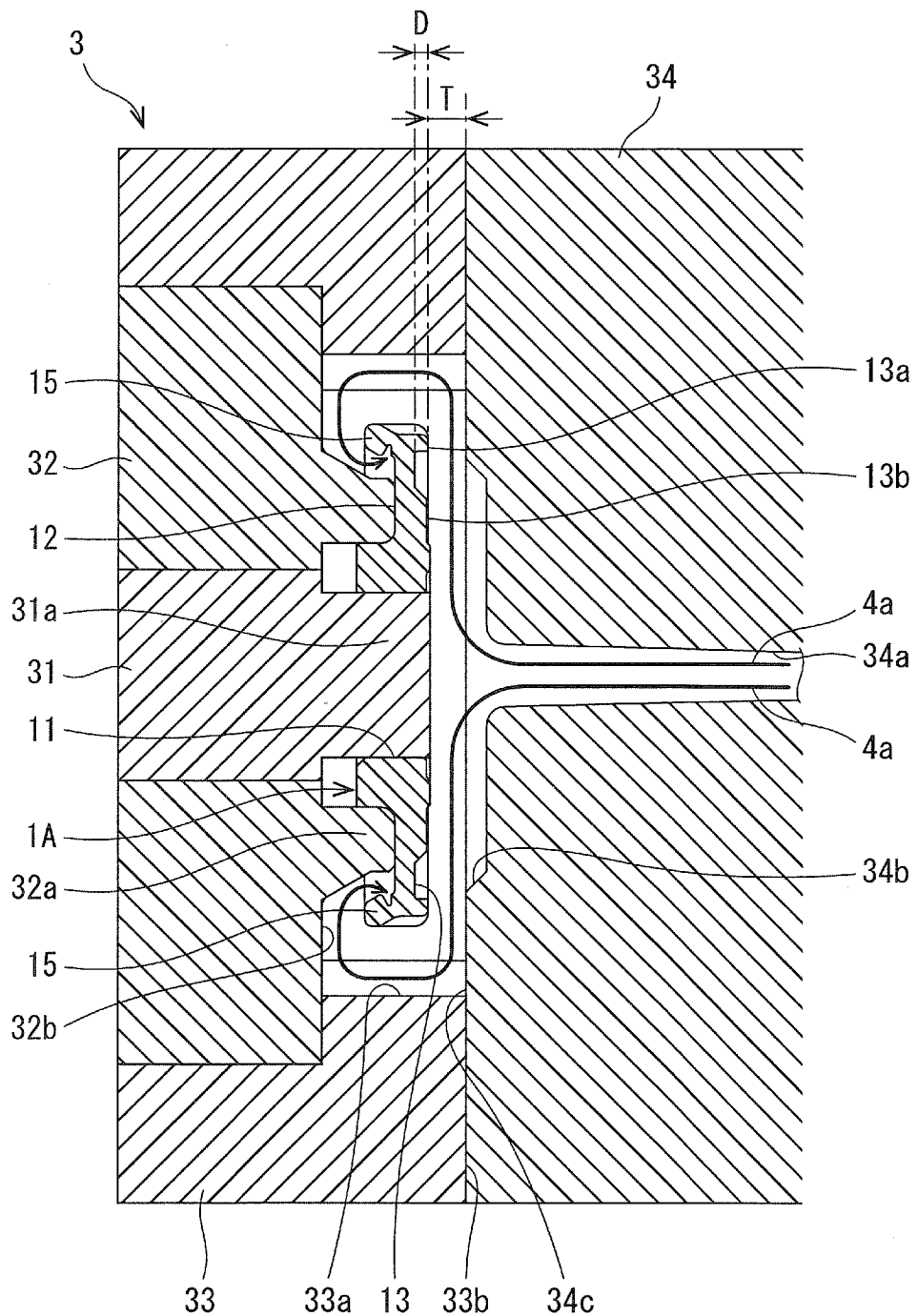
FIG. 9 is a view explaining a mold used in injection molding for manufacturing the worm wheel of the second embodiment, and a flow of a synthetic resin during injection molding.

As shown in FIG. 9, a mold 3 used in injection molding has a first member 31, a second member 32, a third member 33, and a fourth member 34. The first member 31 has a protrusion 31*a* adapted to be fitted in the center hole 11 of the core 1A. The second member 32 has a protrusion 32*a* adapted to be fitted in the first annular recess 12 and a recessed portion 32*b* forming a cavity. The third member 33 has a recessed portion 33*a* forming the cavity and a parting surface 33*b*. The fourth member 34*a* has a sprue 34*a*, a recessed portion 34*b* forming a disk gate, and a parting surface 34*c*.

First, the core 1, which is made of metal, is manufactured by a conventionally known method. At this time, a depth D of the second annular recess 12 is in a range of 0.5 mm to half of a gate thickness T. In addition, even when the gate thickness T is 6.0 mm or more, the depth D of the second annular recess 12 is set to 3.0 mm or less.

Then, the core 1A is arranged in the mold 3 such that the second annular recess 13 faces the gate and such that an axial direction of the sprue 34*a* and the axial direction of the core 1A are aligned with each other. At this time, an inclined inner circumferential surface of the recessed portion 34*b* forming the disk gate is a parallel to the inner circumferential wall surface 13*e* of the second annular recess 13 of the core 1A. Then, by operating an injection molding machine, the rim portion 2A is integrally molded with the core 1A.

At this time, a synthetic resin, which is supplied from a nozzle of the injection molding machine, is introduced from the sprue 34*a* into the cavity through the disk gate. As shown by a line 4*a* in FIG. 9, the synthetic resin goes around from the other axial end surface (surface having the second annular recess 13 formed thereon) of the core 1A into the one axial end surface thereof (surface having the first annular recess 12 formed thereon) through the outside of the outer circumference 15, and then reaches the third annular recess 14.

Figure 10:
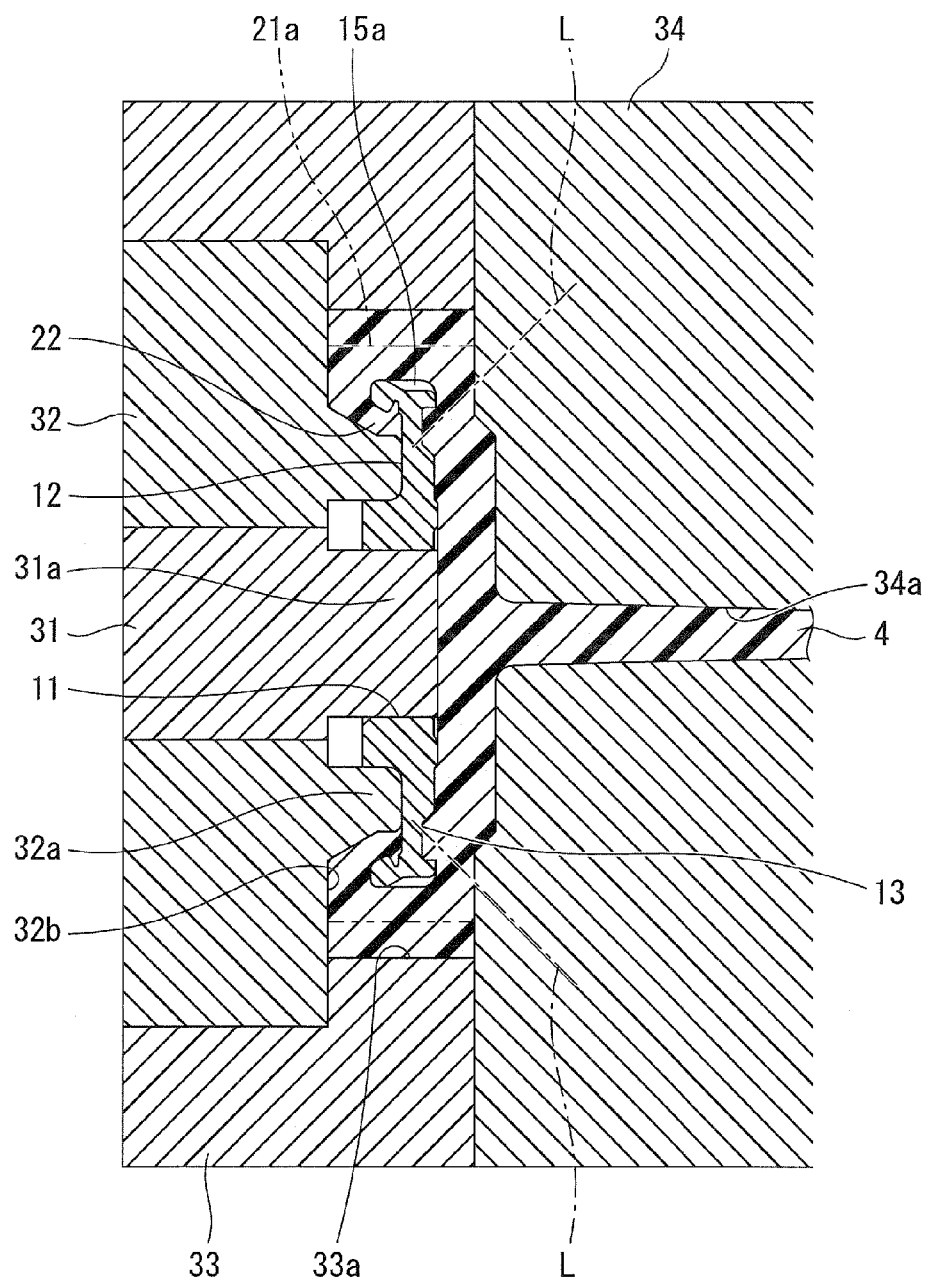
FIG. 10 is a view explaining a method of manufacturing the worm wheel of the second embodiment, showing a state where the synthetic resin is filled and solidified in the mold by injection molding.

FIG. 10 shows a state where the synthetic resin 4 is filled in the mold by injection molding and then the synthetic resin 4 is solidified. After the mold 3 is removed in such a state, the synthetic resin 4 is separated in a cone shape along a line L, thereby obtaining the worm wheel 10A shown FIG. 7. A line 21*a* in FIG. 10 is a line representing a valley of the gear 21.

In the second embodiment, a relationship of the depth D of the second annular recess 13 of the core 1A and the gate thickness T satisfies D≤T/2 (namely, the depth D of the second annular recess 13 of the core 1A is not deeper than half of an axial distance between the other axial end surface of the core 1A and the end surface portion 13*a* (the other axial end surface) of the rim portion 2A), the end surface portions 13*a*, 13*b*, between which the second annular recess 13 is disposed, are arranged on the same plane F, and the third annular recess 14 has the tapered surface 14*b*. Therefore, a flow of the synthetic resin is hardly disturbed during injection molding of the synthetic resin. Thus, the synthetic resin is clearly expanded over the whole of the cavity (up to the third annular recess 14, which is a terminal part of the flow), thereby preventing occurrence of a weld line or the like which is a cause of decreasing in coupling strength between the core 1A and the rim portion 2A.

The worm wheel 10A includes the second annular recess 13 and the third annular recess 14 as well as the first annular recess 12 formed on the core 1A, and has a fixation of the second inner circumferential portion 23 of the rim portion 2A to the second annular recess 12 and an engagement of the protrusion 24 of the rim portion 2A with the third annular recess 14, in addition to a fixation of the first inner circumferential portion 22 of the rim portion 2A to the first annular recess 12. Thus, coupling strength between the core 1A and the rim portion 2A is higher than that of a worm wheel 100 in FIG. 27. Also, because the outer circumferential wall surface 13*c* of the second annular recess 13 extends from the bottom surface 13*d* to be perpendicular to the bottom surface 13*d*, the worm wheel 10A can be made to have a further increased coupling strength between the core 1A and the rim portion 2A, as compared to a configuration in which the wall surface 13*c* is a tapered surface.

Although the worm wheel 10A according to the second embodiment is provided with only one second annular recess 13 on the axial end surface of the core 1A, when the depth D of the second annular recess 12 cannot be set to be 0.5 mm or more, a plurality of second annular recesses 12, which have a depth D of 0.1 mm or more and 0.4 mm or less, may be provided on the axial end surface of the core 1A, thereby increasing in coupling strength between the core 1A and the rim portion 2A.

The worm wheel 10A is used in a speed reducer for a worm gear mechanism forming an electric power steering apparatus.

Figure 11:
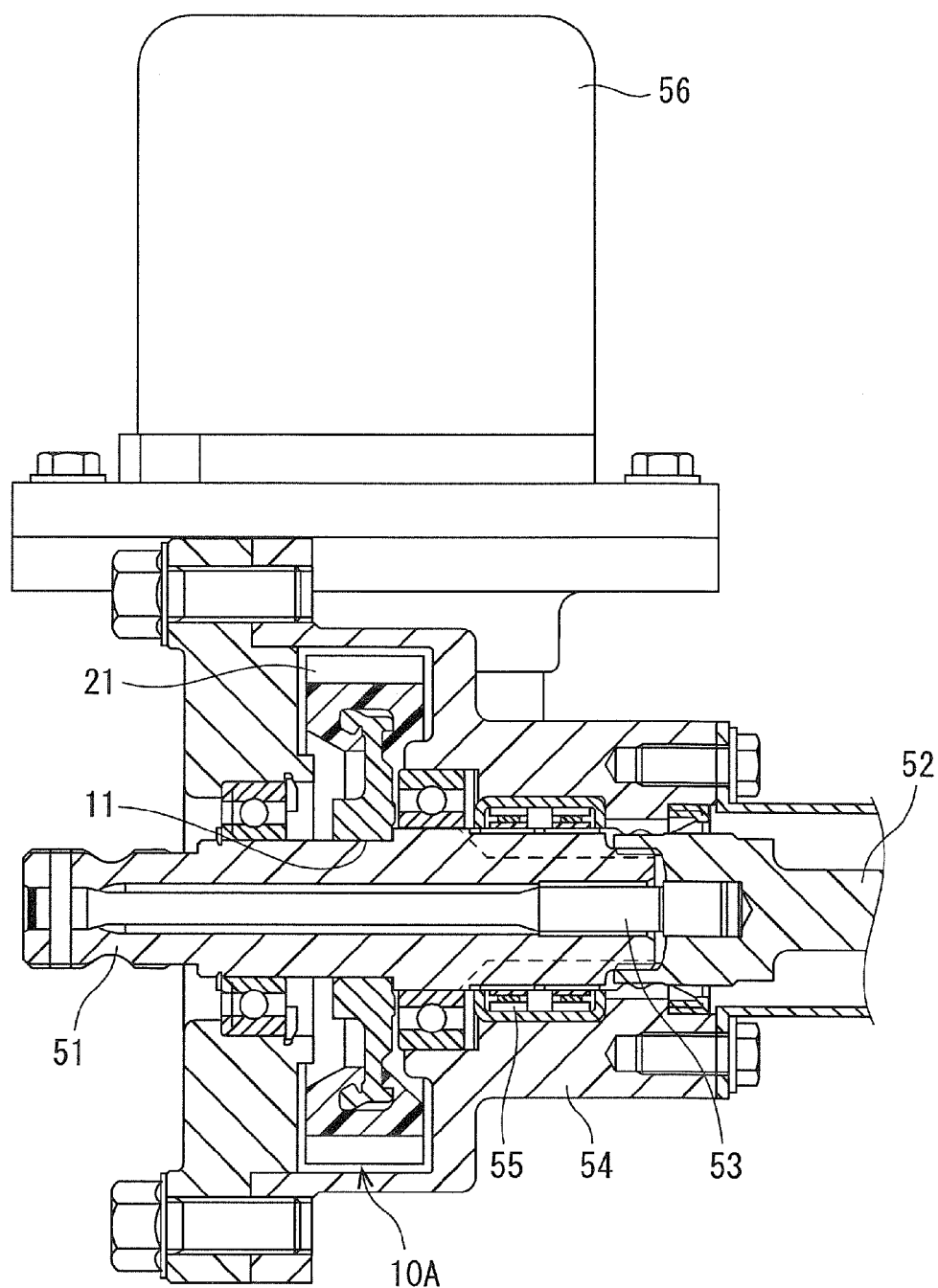
FIG. 11 is a sectional view showing a state where the worm wheel of the second embodiment is attached to a speed reducer for an electric power steering apparatus.
Figure 12:
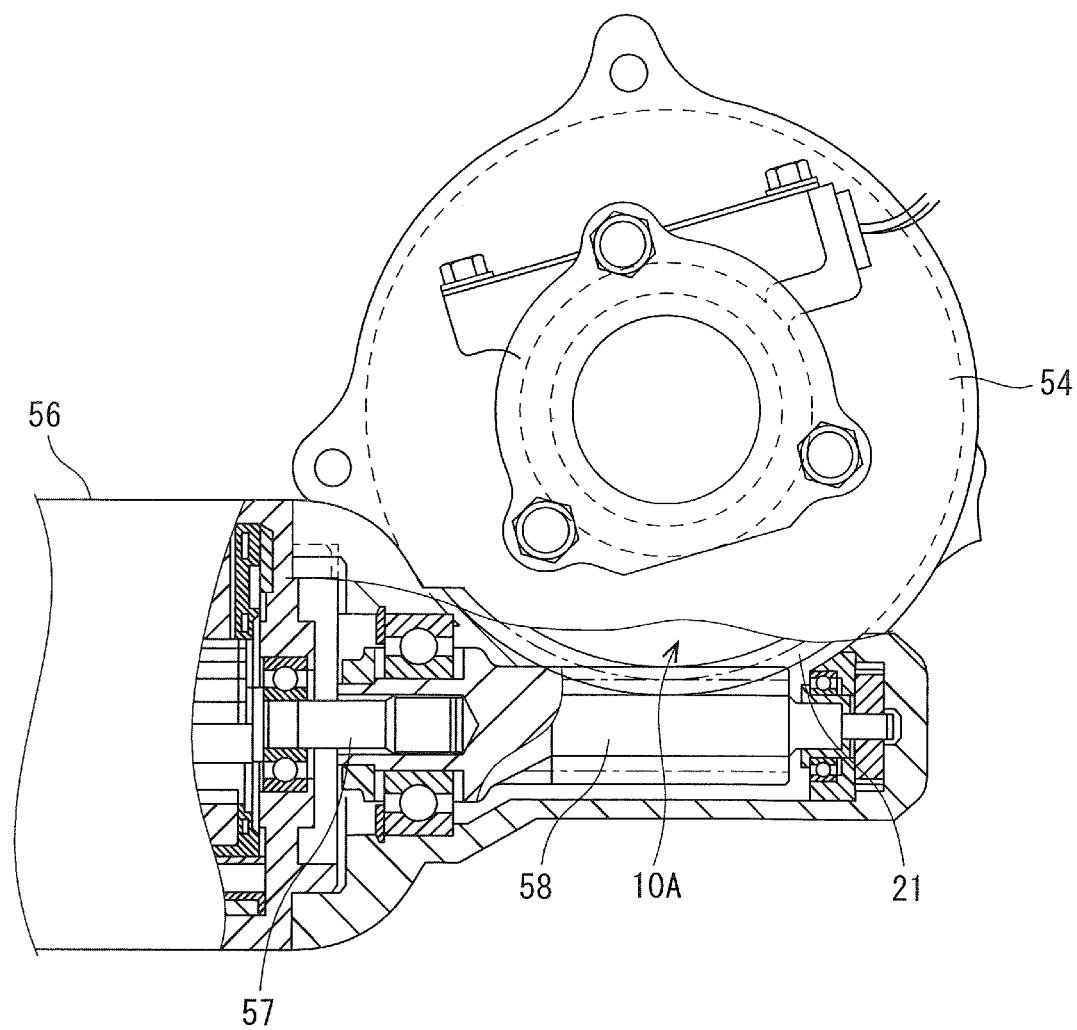
FIG. 12 is a view explaining a worm gear mechanism forming the speed reducer of FIG. 11.

FIG. 11 shows the electric power steering apparatus having the speed reducer, into which the worm wheel 10A is incorporated. FIG. 12 is a view explaining the speed reducer worm gear mechanism in FIG. 11.

In this example, an output shaft 51 and a steering shaft 52 in a steering mechanism for the electric power steering apparatus are coupled to each other by a torsion bar 53. A torque sensor 55 is installed on an inner surface of a housing 54 rotatably supporting the output shaft 51. The torque sensor 55 measures a torque transmitted between the steering shaft 52 and the output shaft 51.

As shown in FIG. 12, a worm 58 is coupled on an output shaft 57 of an electric motor 56. The gear 21 of the worm wheel 10A is engaged with the worm 58.

According to the electric power steering apparatus, an electric current is supplied to the electric motor 56 based on a torque value measured by the torque sensor 55, and thus an appropriate assistant torque is applied to the output shaft 51 through the speed reducer including the worm 57 and the worm wheel 10A.

Figure 13:
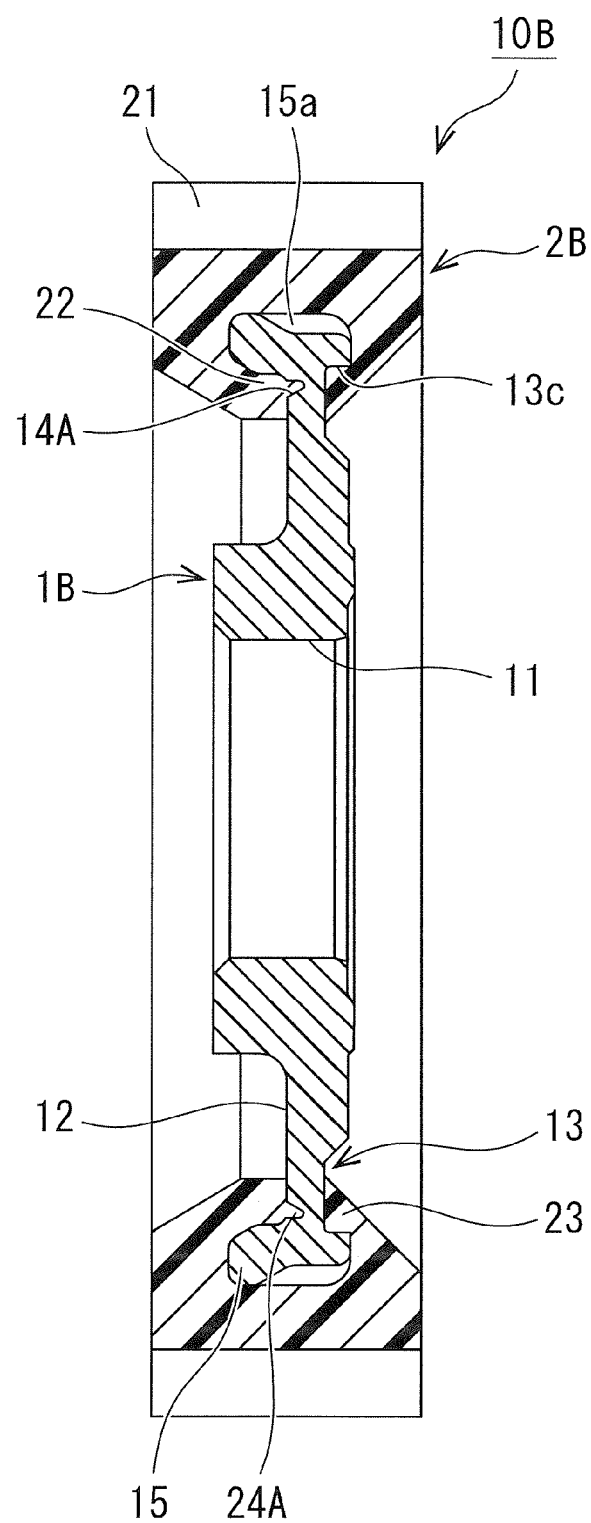
FIG. 13 is a sectional view showing a worm wheel according to a third embodiment of the invention.
Figure 14:
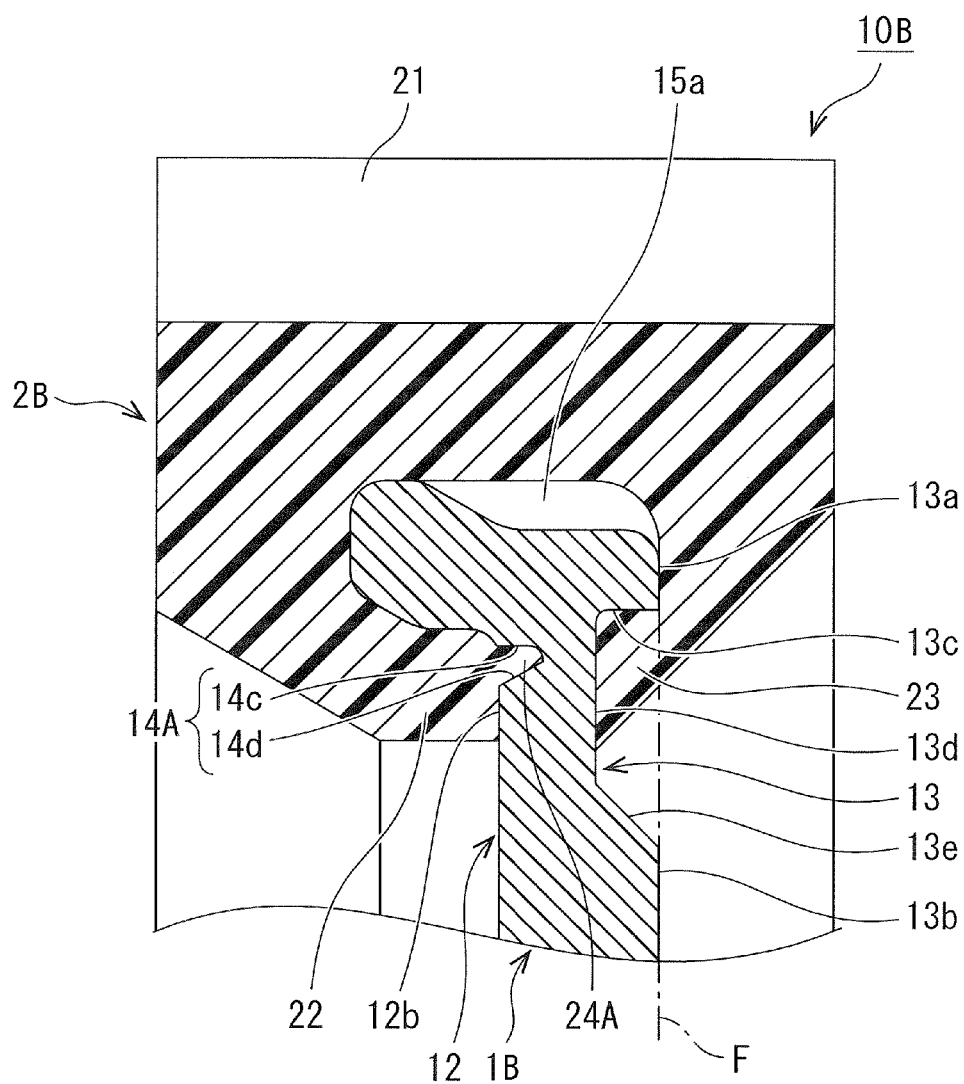
FIG. 14 is an enlarged view showing a part of FIG. 13.

Next, a third embodiment of the present invention will be described. FIG. 13 is a sectional view showing a worm wheel according to the third embodiment, and FIG. 14 is an enlarged view showing a part thereof As shown in FIGS. 13 and 8, the worm wheel 10B of the third embodiment has a core 1B made of metal and a substantially annular rim portion 2B covering an outer circumference 15 of the core 1B. The core 1B is arranged on the substantially center of the rim portion 2B, as viewed in an axial direction thereof.

The core 1B is formed in a substantially circular disk shape. The core 1B has a center hole 11, into which a shaft is fitted, one axial end surface having a first annular recess 12 formed thereon, the other axial end surface having a second annular recess 13 formed thereon, a third annular recess 14A formed on a radially outer portion (surface located in a radially outer region) 12b of a bottom surface of the first annular recess 12, and the outer circumference 15 having a spline 15a formed thereon. As viewed in an axial direction, the spline 15a is provided on a part of the outer circumference 15, on the side of which the second annular recess 13 is formed. The other part of the outer circumference 15, on the side of which the first annular recess 12 is formed, is configured as a cylindrical surface. A part of the core 1B, which is located more radially inward than the first annular recess 12, becomes a boss portion 11a having the center hole 11.

As shown in FIG. 14, the other axial end surface of the core 1B has end surface portions 13a, 13b, between which the second annular recess 13 is located as viewed in a radial direction thereof. The end surface portions 13a, 13b are flat surfaces and are arranged on the same plane as shown by a one-dot chain line F. The second annular recess 13 has a bottom surface 13d, an outer circumferential wall surface 13c extending in the axial direction from the bottom surface 13d to be perpendicular to the bottom surface 13d, and an inner circumferential wall surface 13e extending from the bottom surface 13d toward the end surface portion 13b in a tapered shape to form an obtuse angle relative to the bottom surface 13d. The outer circumferential wall surface 13c of the second annular recess 13 is configured as a cylindrical surface. An outer circumferential wall surface 12a of the first annular recess 12 is configured as a cylindrical surface having a diameter smaller than that of the outer circumferential wall surface 13c of the second annular recess 13. Namely, the outer circumferential wall surface 13c of the second annular recess 13 is provided more radially outward than the outer circumferential wall surface 12a of the first annular recess 12.

The third annular recess 14A, as shown in FIG. 14, has an axial surface 14c extending in a direction approximately equal to the axial direction of the core 1B and a tapered surface 14d configured to be expanded on an opening side of the third annular recess 14A.

The rim portion 2B is integrally formed with the core 1B by injection molding of synthetic resin. A gear 21 is formed on an outer circumferential portion of the rim portion 2B. The rim portion 2B has a first inner circumferential portion 22 fixed to the first annular recess 12 of the core 1B, a second inner circumferential portion 23 fixed to the second annular recess 13, and a protrusion 24A engaged with the third annular recess 14A.

As shown in FIG. 14, the first inner circumferential portion 22 extends from one axial end surface of the rim portion 2B to a radially outer region of the first annular recess 12 and is fixed to the outer circumferential wall surface 12a of the first annular recess 12 and the radially outer portion 12b of the bottom surface thereof. An inner circumferential surface of the first inner circumferential portion 12 has a cylindrical surface abutted against the radially outer portion 12b of the bottom surface of the first annular recess 12 and an inclined surface extending radially outward from the cylindrical surface toward the one axial end surface of the rim portion 2B. The second inner circumferential portion 23 extends from the other axial end surface of the rim portion 2B to a radially outer region of the second annular recess 13 and is fixed to the outer circumferential wall surface 13c of the second annular recess 13 and a radially outer portion of the bottom surface 13d thereof. An inner circumferential surface of the second inner circumferential portion 23 is configured as an inclined surface extending radially outward from the bottom surface 13d of the second annular recess 13 toward the other axial end surface of the rim portion 2B. A radial position, at which the inner circumferential surface of the first inner circumferential portion 22 is abutted against the radially outer portion 12b of the bottom surface of the first annular recess 12, is approximately equal to a radial position, at which the inner circumferential surface of the second inner circumferential portion 23 is abutted against the bottom surface 13d of the second annular recess 13.

The rim portion 2B has a protrusion engaged with a valley of the spline 15a of the core 1B. By such an engagement of the protrusion of the rim portion 2B with the valley of the spline 15a of the core 1B, the rim portion 2B and the core 1B are coupled to each other to be integrally rotated and thus to allow a torque to be transmitted therebetween.

The worm wheel 10B is manufactured by the same method as those of the worm wheel 10A according to the second embodiment, except that a shape of the core used is different therefrom.

In the third embodiment, a relationship of the depth D of the second annular recess 13 and the gate thickness T satisfies D≤T/2, the end surface portions 13a, 13b, between which the second annular recess 13 is disposed, are arranged on the same plane F, and the third annular recess 14A has the tapered surface 14d. Therefore, a flow of the synthetic resin is hardly disturbed during injection molding of the synthetic resin. Thus, the synthetic resin is clearly expanded over the whole of the cavity (up to the third annular recess 14A, which is a terminal part of the flow), thereby preventing occurrence of a weld line or the like which is a cause of decreasing in coupling strength between the core 1A and the rim portion 2B.

The worm wheel 10B includes the second annular recess 13 and the third annular recess 14A as well as the first annular recess 12 formed on the core 1B, and has a fixation of the second inner circumferential portion 23 of the rim portion 2B to the second annular recess 12 and an engagement of the protrusion 24A of the rim portion 2B with the third annular recess 14A, in addition to a fixation of the first inner circumferential portion 22 of the rim portion 2B to the first annular recess 12. Thus, coupling strength between the core 1B and the rim portion 2B is higher than that of a worm wheel 100 in FIG. 27.

Also, because the outer circumferential wall surface 13c of the second annular recess 13 extends from the bottom surface 13d to be perpendicular to the bottom surface 13d, the worm wheel 10B can be made to have a further increased coupling strength between the core 1B and the rim portion 2B, as compared to a configuration in which the wall surface 13c is a tapered surface.

The worm wheel 10B is identical to the worm wheel 10A according to the second embodiment, except that a position, at which the third annular recess is formed, is different therefrom, but due such a difference, the worm wheel 10B has advantages over the worm wheel 10A in the following respects.

The third annular recess 14 of the worm wheel 10A is adapted to be recessed in a radial direction of the core 1A, whereas the third annular recess 14A of the worm wheel 10B is adapted to be recessed in an axial direction of the core 1B. When a core of a shape not having the third annular recess 14 or 14A is formed by plastic working, such as forging, forming is performed by applying a forming load in an axial direction of the core. Therefore, in the case of the core 1B having the third annular recess 14A, the third annular recess 14A is simultaneously formed by a forming load applied in the axial direction of the core 1B, whereas in the case of the core 1A having the third annular recess 14, forming performed by applying a forming load in a direction perpendicular to the axial direction of the core 1A is additionally required to form the third annular recess 14. Thus, as compared to the worm wheel 10A, the worm wheel 10B can reduce cost incurred in forming of the core.

Figure 15:
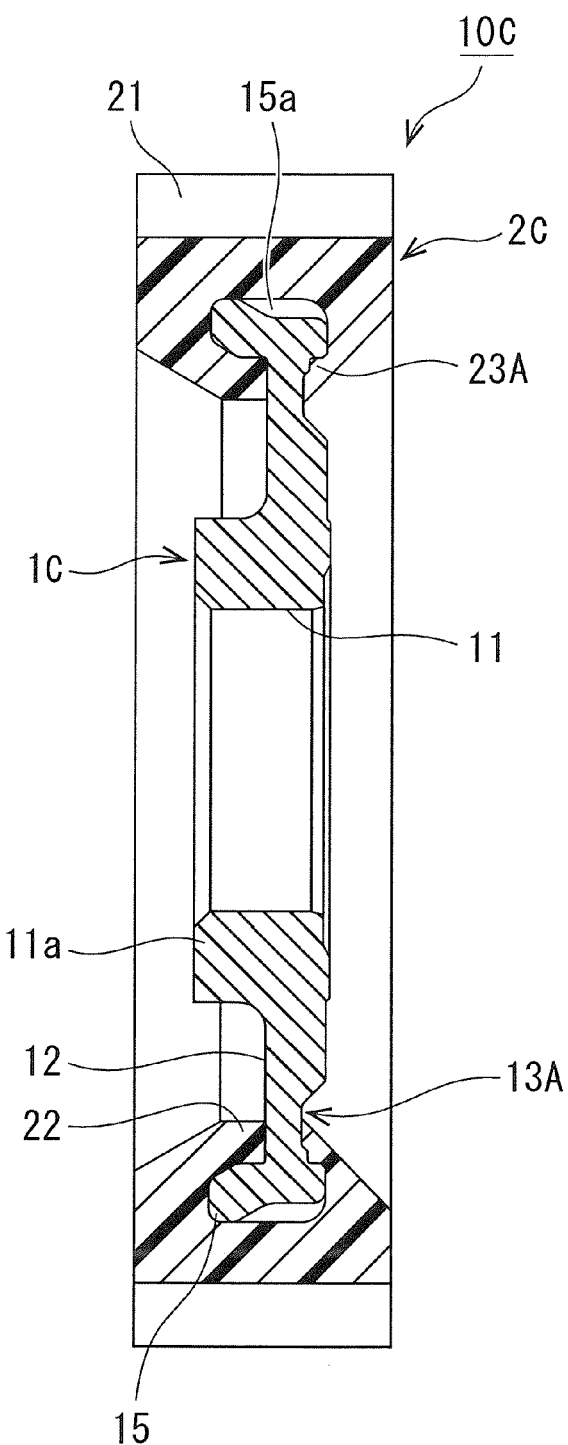
FIG. 15 is a sectional view showing a worm wheel according to a fourth embodiment of the invention.
Figure 16:
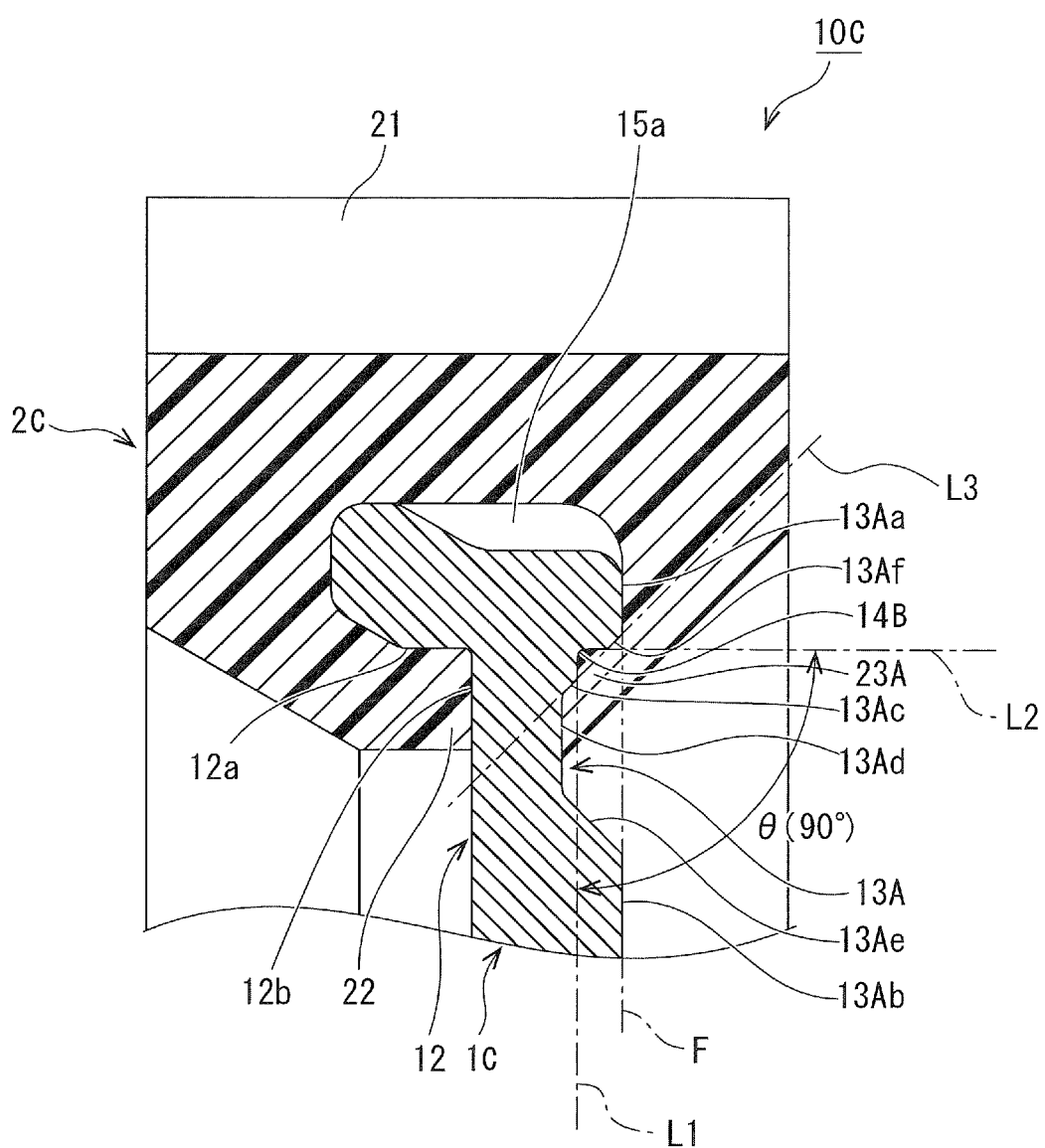
FIG. 16 is an enlarged view showing a part of FIG. 15.

FIG. 15 is a sectional view showing a worm wheel according to a fourth embodiment, and FIG. 16 is an enlarged view showing a part thereof As shown in FIGS. 15 and 16, the worm wheel 10C of this embodiment has a core 1C made of metal and a substantially annular rim portion 2C covering an outer circumference 15 of the core 1C.

The core 1C is formed in a substantially circular disk shape. The core 1C has a center hole 11, into which a shaft is fitted, one axial end surface having a first annular recess 12 formed thereon, the other axial end surface having a second annular recess 13A formed thereon, and the outer circumference 15 having a spline 15a formed thereon. As viewed in an axial direction, the spline 15a is provided on a part of the outer circumference 15, on the side of which the second annular recess 13A is formed. The other part of the outer circumference 15, on the side of which the first annular recess 12 is formed, is configured as a cylindrical surface. A part of the core 1C, which is located more radially inward than the first annular recess 12, becomes a boss portion 11a having the center hole 11.

As shown in FIG. 16, the other axial end surface of the core 1C has end surface portions 13Aa, 13Ab, between which the second annular recess 13A is located as viewed in a radial direction thereof. The end surface portion 13Aa, 13Ab are a flat surface and are arranged on the same plane as shown by a one-dot chain line F. The second annular recess 13A has a bottom surface 13Ad, and an inner circumferential wall surface 13Ae extending from the bottom surface 13Ad toward the end surface portion 13Ab in a tapered shape to form an obtuse angle relative to the bottom surface 13Ad.

An outer circumferential wall surface of the second annular recess 13A has a tapered surface 13Ac extending from the bottom surface 13Ad toward the end surface portion 13Aa to form an obtuse angle relative to the bottom surface 13Ad, a third annular recess 14A formed radially outside the tapered surface 13Ac, and an outer tapered surface 13Af formed radially outside the third annular recess 14A. A cross-sectional shape of the third annular recess 14A is a right-angled triangle having, as two sides, a surface (surface along a line L1) parallel to the bottom surface 13Ad of the second annular recess 13A and a surface (surface along a line L2) perpendicular to the bottom surface 13Ad. The tapered surface 13Ac and the outer tapered surface 13Af are arranged on the same line L3. Namely, the outer tapered surface 13Af is configured as a part of a surface extending from the tapered surface 13Ac. The surface (surface along the line L2) of the third annular recess 14A perpendicular to the bottom surface 13Ad of the second annular recess 13A is configured as a cylindrical surface. An outer circumferential wall surface 12a of the first annular recess 12 is configured as a cylindrical surface having a diameter approximately equal to that of the surface of the third annular recess 14A perpendicular to the bottom surface 13Ad of the second annular recess 13A.

The rim portion 2C is integrally formed with the core 1C by injection molding of synthetic resin. A gear 21 is formed on an outer circumferential portion of the rim portion 2C.

The rim portion 2C has a first inner circumferential portion 22 fixed to the first annular recess 12 of the core 1C and a second inner circumferential portion 23A fixed to the second annular recess 13A.

As shown in FIG. 16, the first inner circumferential portion 22 extends from one axial end surface of the rim portion 2C to a radially outer region of the first annular recess 12 and is fixed to the outer circumferential wall surface 12a of the first annular recess 12 and a radially outer portion 12b of a bottom surface of the first annular recess 12. An inner circumferential surface of the first inner circumferential portion 12 has a cylindrical surface abutted against the radially outer portion 12b of the bottom surface of the first annular recess 12 and an inclined surface extending radially outward from the cylindrical surface toward the one axial end surface of the rim portion 2C. The second inner circumferential portion 23A extends from the other axial end surface of the rim portion 2C to a radially outer region of the second annular recess 13A and is fixed to the outer circumferential wall surface (tapered surface 13Ac, third annular recess 14A, and outer tapered surface 13Af) of the second annular recess 13A and a radially outer portion of the bottom surface 13Ad thereof. An inner circumferential surface of the second inner circumferential portion 23A is configured as an inclined surface extending radially outward from the bottom surface 13Ad of the second annular recess 13A toward the other axial end surface of the rim portion 2C (see a line L in FIG. 18). The inner circumferential surface of the second inner circumferential portion 23A extends along the line L3 to be parallel to the tapered surface 13Ac and the outer tapered surface 13Af of the second annular recess 13A, and thus a thickness of the second inner circumferential portion 23A in a range between the bottom surface 13Ad of the second annular recess 13A and the end surface portion 13Aa is adapted to be approximately constant, except a part thereof inside the third annular recess 14A. A radial position, at which the inner circumferential surface of the second inner circumferential portion 23A and the first inner circumferential portion 22 is abutted against the radially outer portion 12b of the bottom surface of the first annular recess 12, is approximately equal to a radial position, at which the inner circumferential surface of the second inner circumferential portion 23A is abutted against the bottom surface 13Ad of the second annular recess 13A.

The rim portion 2C has a protrusion engaged with a valley of the spline 15a of the core 1C. By such an engagement of the protrusion of the rim portion 2C with the valley of the spline 15a of the core 1C, the rim portion 2C and the core 1C are coupled to each other to be integrally rotated and thus to allow a torque to be transmitted therebetween.

The worm wheel 10C is manufactured according to the following method.

Figure 17:
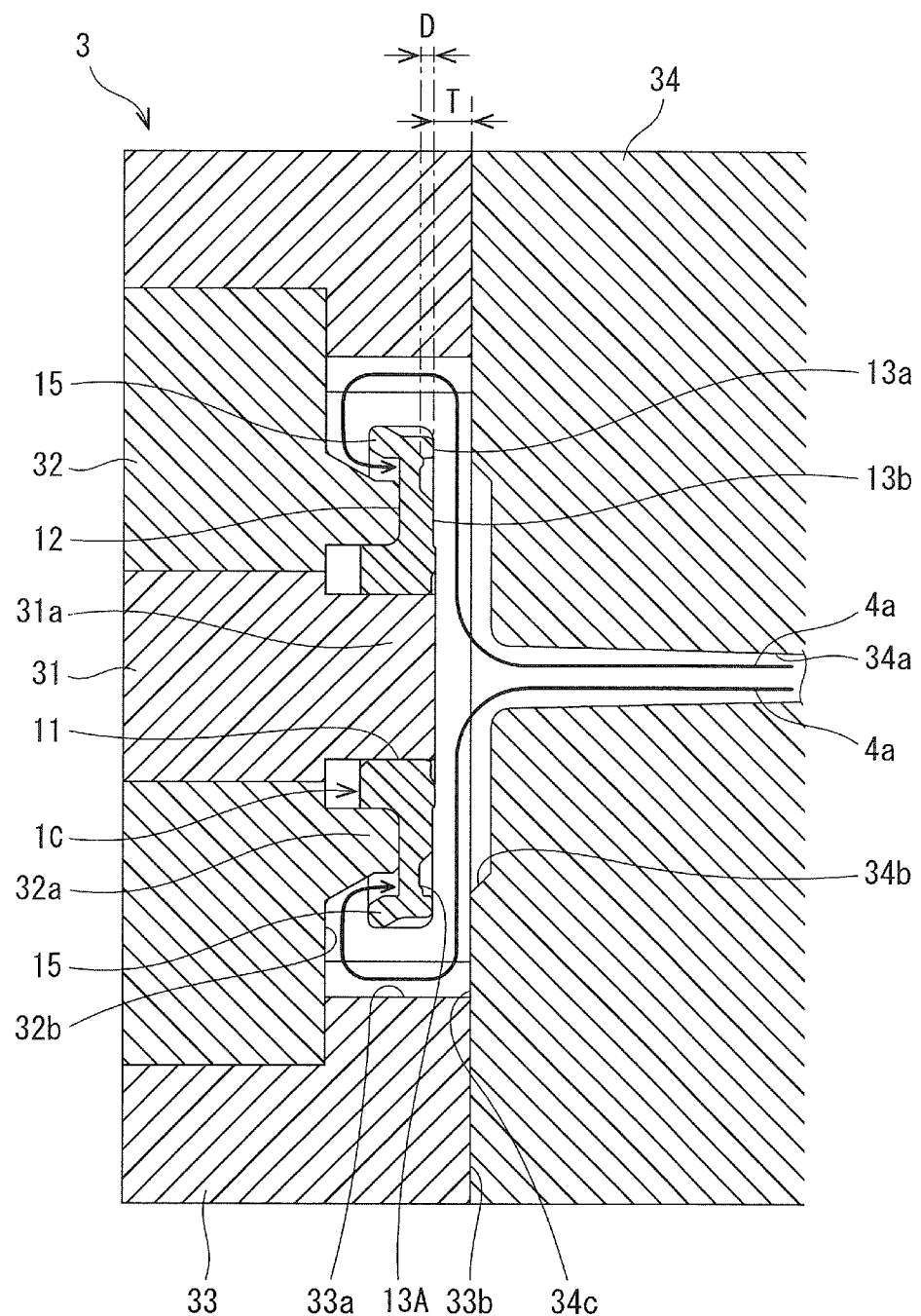
FIG. 17 is a view explaining a mold used in injection molding for manufacturing the worm wheel of the fourth embodiment, and a flow of a synthetic resin during injection molding.

As shown in FIG. 17, a mold 3 used in injection molding has a first member 31, a second member 32, a third member 33, and a fourth member 34. The first member 31 has a protrusion 31a adapted to be fitted in the center hole 11 of the core 1C. The second member 32 has a protrusion 32a adapted to be fitted in the first annular recess 12 and a recessed portion 32b forming a cavity. The third member 33 has a recessed portion 33a forming the cavity and a parting surface 33b. The fourth member 34a has a sprue 34a, a recessed portion 34b forming a disk gate, and a parting surface 34c.

First, the core 1C, which is made of metal, is manufactured by a conventionally known method. At this time, a depth D of the second annular recess 12 is in a range of 0.5 mm to half of a gate thickness T. In addition, even when the gate thickness T is 6.0 mm or more, the depth D of the second annular recess 12 is set to 3.0 mm or less.

Then, the core 1C is arranged in the mold 3 such that the second annular recess 13A faces the gate and such that an axial direction of the sprue 34a and the axial direction of the core 1C are aligned with each other. At this time, an inclined inner circumferential surface of the recessed portion 34b forming the disk gate faces the inner circumferential wall surface 13Ae of the second annular recess 13A of the core 1C (they are at substantially the same radial position), and is parallel to the inner circumferential wall surface 13Ae of the second annular recess 13A of the core 1C. Then, by operating an injection molding machine, the rim portion 2C is integrally molded with the core 1C.

At this time, a synthetic resin, which is supplied from a nozzle of the injection molding machine, is introduced from the sprue 34a into the cavity through the disk gate. As shown by a line 4a in FIG. 17, the synthetic resin goes around from the other axial end surface (surface having the second annular recess 13A formed thereon) of the core 1C into the one axial end surface thereof (surface having the first annular recess 12 formed thereon) through the outside of the outer circumference 15.

Figure 18:
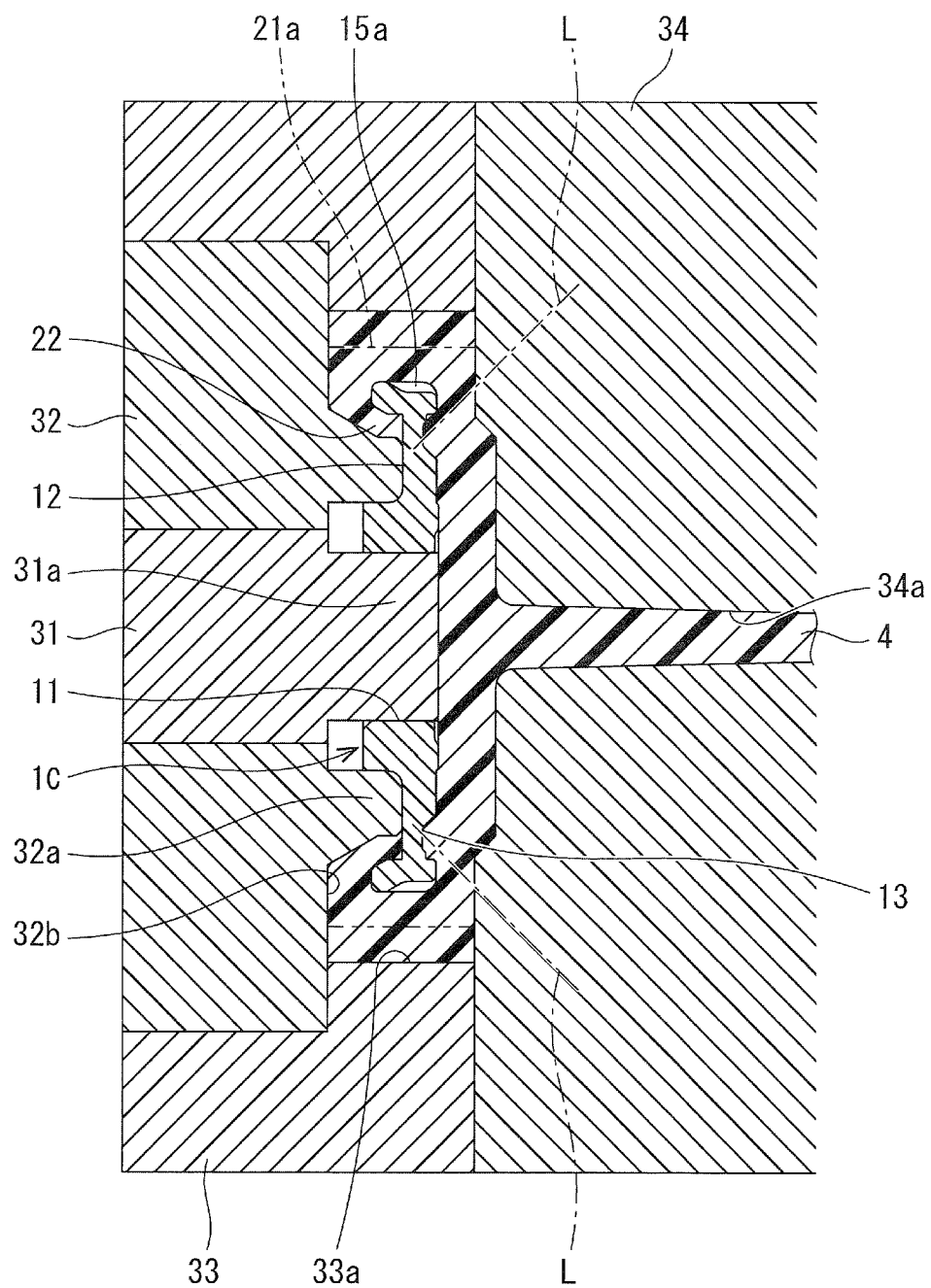
FIG. 18 is a view explaining a method of manufacturing the worm wheel of the fourth embodiment, showing a state where the synthetic resin is filled and solidified in the mold by injection molding.

FIG. 18 shows a state where the synthetic resin 4 is filled in the mold by injection molding and then the synthetic resin 4 is solidified. After the mold 3 is removed in such a state, the synthetic resin 4 is separated in a cone shape along a line L, thereby obtaining the worm wheel 10C shown FIG. 15. A line 21a in FIG. 18 is a line representing a valley of the gear 21.

In the fourth embodiment, a relationship of the depth D of the second annular recess 13A of the core 1C and the gate thickness T satisfies D≤T/2, the tapered surfaces (tapered surface 13Ac and outer tapered surface 13Af) are formed radially inward and outward of the third annular recess 14A, and the end surface portions 13Aa, 13Ab, between which the second annular recess 13A is disposed, are arranged on the same plane F. Therefore, a flow of the synthetic resin is hardly disturbed during injection molding of the synthetic resin. Thus, the synthetic resin is clearly expanded over the whole of the cavity (up to the first annular recess 12, which is a terminal part of the flow), thereby preventing occurrence of a weld line or the like which is a cause of decreasing in coupling strength between the core 1C and the rim portion 2C.

The worm wheel 10C includes the second annular recess 13A having the third annular recess 14A as well as the first annular recess 12 formed on the core 1C, and has a fixation of the second inner circumferential portion 23C of the rim portion 2C to the second annular recess 13A, in addition to a fixation of the first inner circumferential portion 22 of the rim portion 2C to the first annular recess 12. Thus, coupling strength between the core 1C and the rim portion 2C is higher than that of a worm wheel 100 in FIG. 27.

Also, because the outer circumferential wall surface of the second annular recess 13A is formed in a shape having the third right-angled annular recess 14A on the tapered surface, the worm wheel 10C can be made to have a further increased coupling strength between the core 1C and the rim portion 2C, as compared to a configuration having a shape consisting of only a tapered surface.

The worm wheel 10C is used in a speed reducer for a worm gear mechanism of an electric power steering apparatus.

Figure 19:
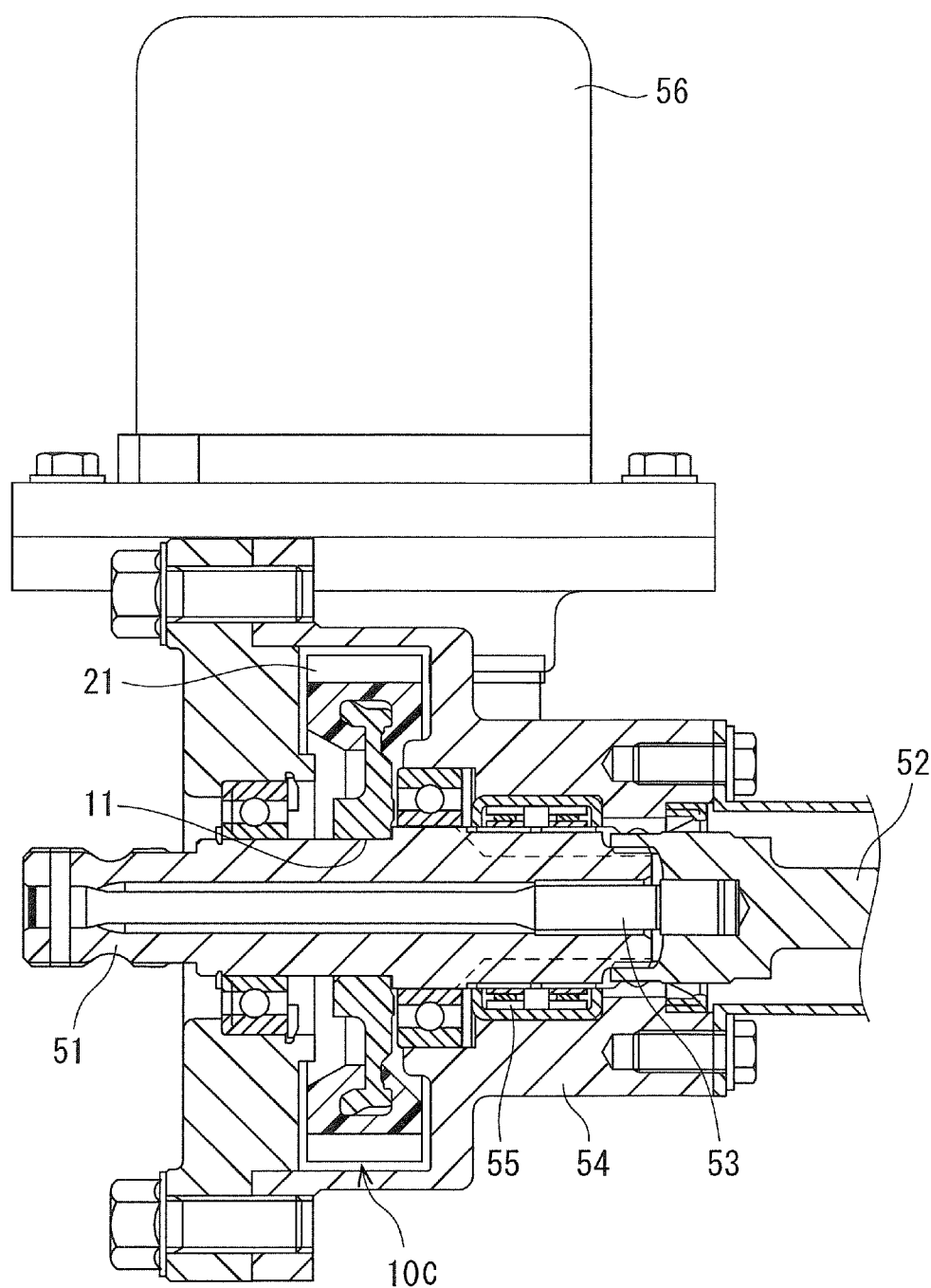
FIG. 19 is a sectional view showing a state where the worm wheel of the fourth embodiment is attached to a speed reducer for an electric power steering apparatus.
Figure 20:
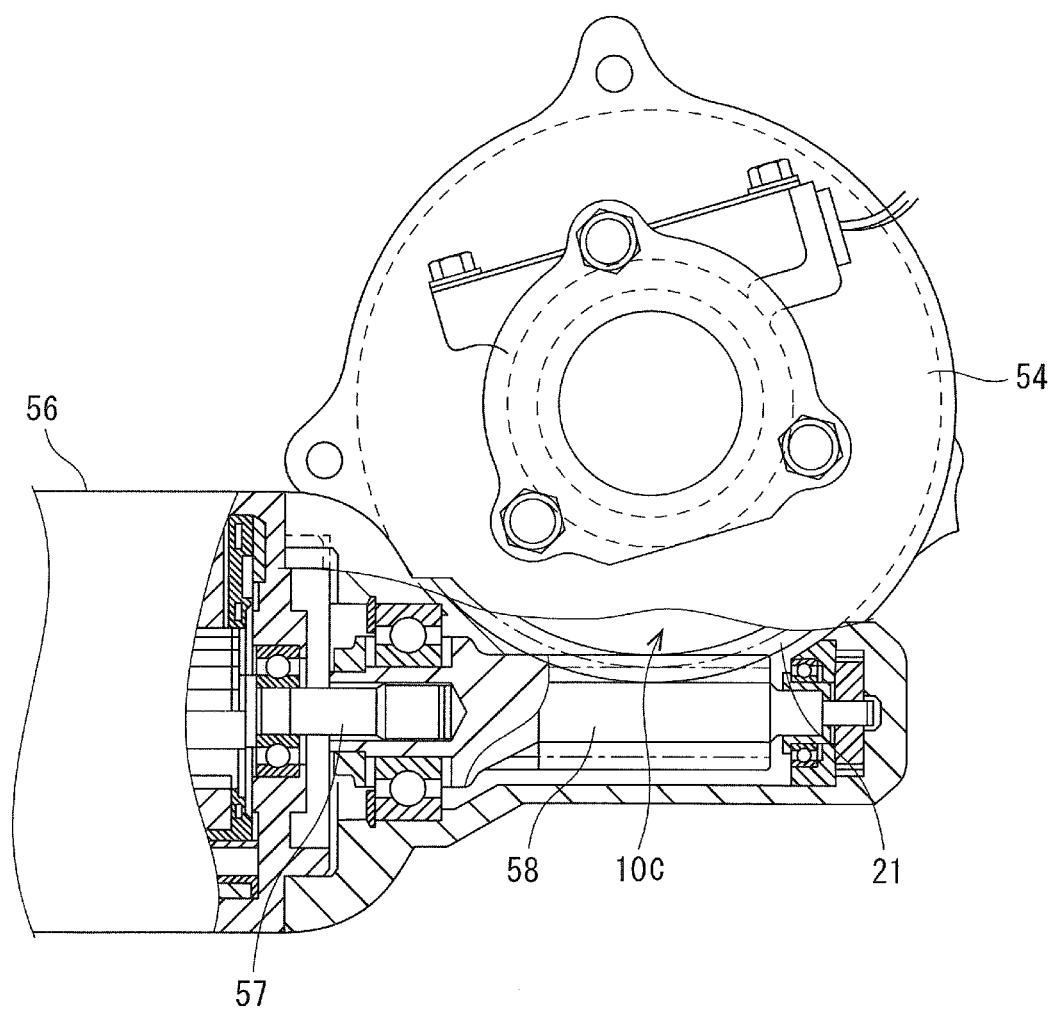
FIG. 20 is a view explaining a worm gear mechanism forming the speed reducer of FIG. 19.

FIG. 19 shows the electric power steering apparatus having the speed reducer, into which the worm wheel 10C is incorporated. FIG. 20 is a view explaining the speed reducer worm gear mechanism in FIG. 19.

In this example, an output shaft 51 and a steering shaft 52 in a steering mechanism for the electric power steering apparatus are coupled to each other by a torsion bar 53. A torque sensor 55 is installed on an inner surface of a housing 54 rotatably supporting the output shaft 51. The torque sensor 55 measures a torque transmitted between the steering shaft 52 and the output shaft 51.

As shown in FIG. 20, a worm 58 is coupled on an output shaft 57 of an electric motor 56. The gear 21 of the worm wheel 10C is engaged with the worm 58.

According to the electric power steering apparatus, an electric current is supplied to the electric motor 56 based on a torque value measured by the torque sensor 55, and thus an appropriate assistant torque is applied to the output shaft 51 through the speed reducer including the worm 57 and the worm wheel 10C.

Figure 21:
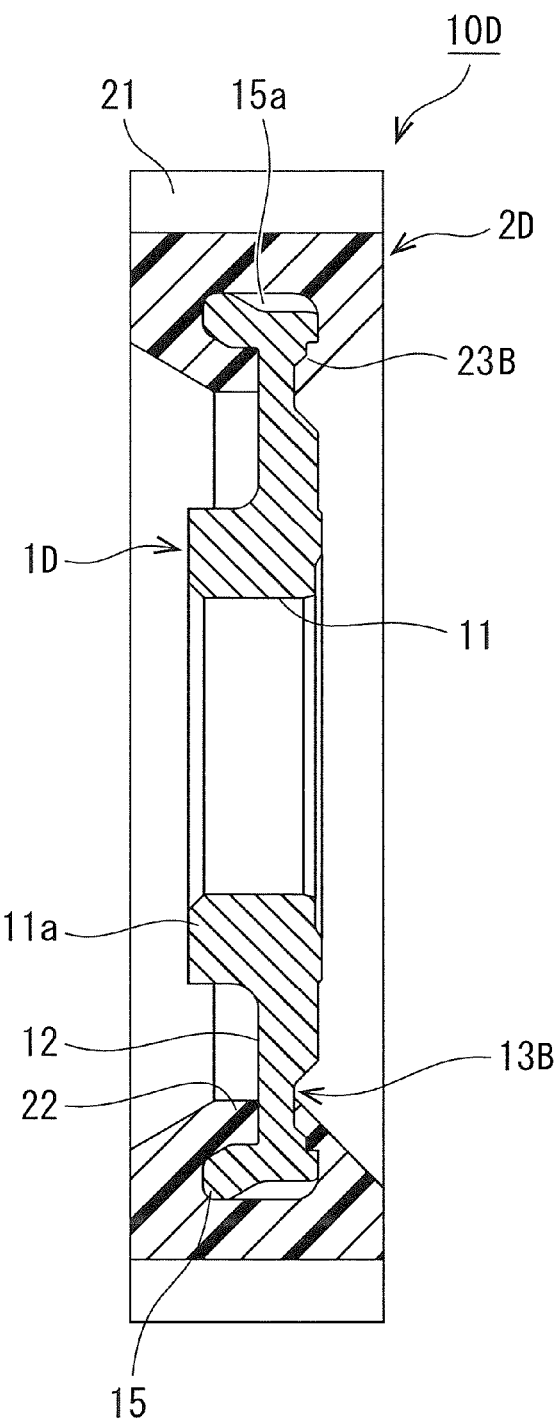
FIG. 21 is a sectional view showing a worm wheel according to a fifth embodiment of the invention.
Figure 22:
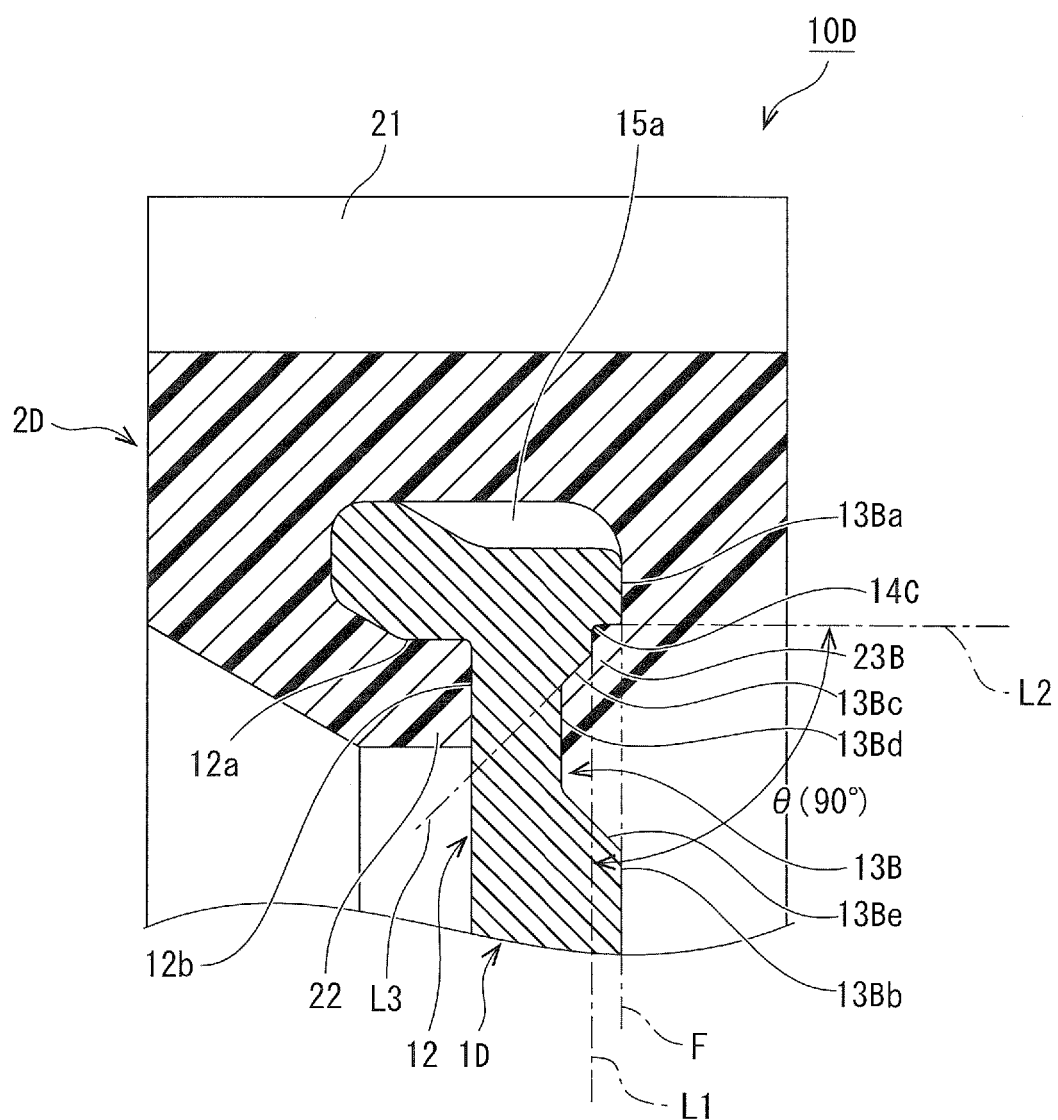
FIG. 22 is an enlarged view showing a part of FIG. 21.

FIG. 21 is a sectional view showing a worm wheel according to a fifth embodiment, and FIG. 22 is an enlarged view showing a part thereof As shown in FIGS. 21 and 22, the worm wheel 10D of the fifth embodiment has a core 1D made of metal and a substantially annular rim portion 2D covering an outer circumference 15 of the core 1D.

The core 1D is formed in a substantially circular disk shape. The core 1D has a center hole 11, into which a shaft is fitted, one axial end surface having a first annular recess 12 formed thereon, the other axial end surface having a second annular recess 13B formed thereon, and the outer circumference 15 having a spline 15a formed thereon. A part of the core 1D, which is located more radially inward than the first annular recess 12, becomes a boss portion 11a having the center hole 11.

As shown in FIG. 22, the other axial end surface of the core 1D has end surface portions 13Ba, 13Bb, between which the second annular recess 13B is located as viewed in a radial direction thereof. The end surface portion 13Ba, 13Bb are a flat surface and are arranged on the same plane as shown by a one-dot chain line F. The second annular recess 13B has a bottom surface 13Bd, and an inner circumferential wall surface 13Be extending from the bottom surface 13Bd toward the end surface portion 13Bb in a tapered shape to form an obtuse angle relative to the bottom surface 13Bd.

An outer circumferential wall surface of the second annular recess 13B has a tapered surface 13Bc extending from the bottom surface 13Bd toward the end surface portion 13Ba to form an obtuse angle relative to the bottom surface 13Ad, and a third annular recess 14B formed radially outside the tapered surface 13Bc. A cross-sectional shape of the third annular recess 14B is a right-angled triangle having, as two sides of the triangle, a surface (surface along a line L1) parallel to the bottom surface 13Bd of the second annular recess 13B and a surface (surface along a line L2) perpendicular to the bottom surface 13Bd. The surface of the third annular recess 14B, which is perpendicular to the bottom surface 13Bd of the second annular recess 13B, extends straight to reach the end surface portion 13Ba on the other axial end surface of the core 1D. The surface (surface along the line L2) of the third annular recess 14B perpendicular to the bottom surface 13Bd of the second annular recess 13B is configured as a cylindrical surface. An outer circumferential wall surface 12a of the first annular recess 12 is configured as a cylindrical surface having a diameter smaller than that of the surface of the third annular recess 14B perpendicular to the bottom surface 13Bd of the second annular recess 13B.

The rim portion 2D is integrally formed with the core 1D by injection molding of synthetic resin. A gear 21 is formed on an outer circumferential portion of the rim portion 2d. The rim portion 2D has a first inner circumferential portion 22 fixed to the first annular recess 12 of the core 1D and a second inner circumferential portion 23B fixed to the second annular recess 13B.

As shown in FIG. 22, the first inner circumferential portion 22 extends from one axial end surface of the rim portion 2D to a radially outer region of the first annular recess 12 and is fixed to the outer circumferential wall surface 12a of the first annular recess 12 and a radially outer portion 12b of a bottom surface thereof. The second inner circumferential portion 23B extends from the other axial end surface of the rim portion 2D to a radially outer region of the second annular recess 13B and is fixed to the outer circumferential wall surface (tapered surface 13Bc and third annular recess 14B) of the second annular recess 13B and a radially outer portion of the bottom surface 13Bd thereof. An inner circumferential surface of the second inner circumferential portion 23B extends along a line L3 to be parallel to the tapered surface 13Bc of the second annular recess 13B.

The rim portion 2D has a protrusion engaged with a valley of the spline 15a of the core 1D. By such an engagement of the protrusion of the rim portion 2D with the valley of the spline 15a of the core 1D, the rim portion 2D and the core 1D are coupled to each other to be integrally rotated and thus to allow a torque to be transmitted therebetween.

Figure 23:
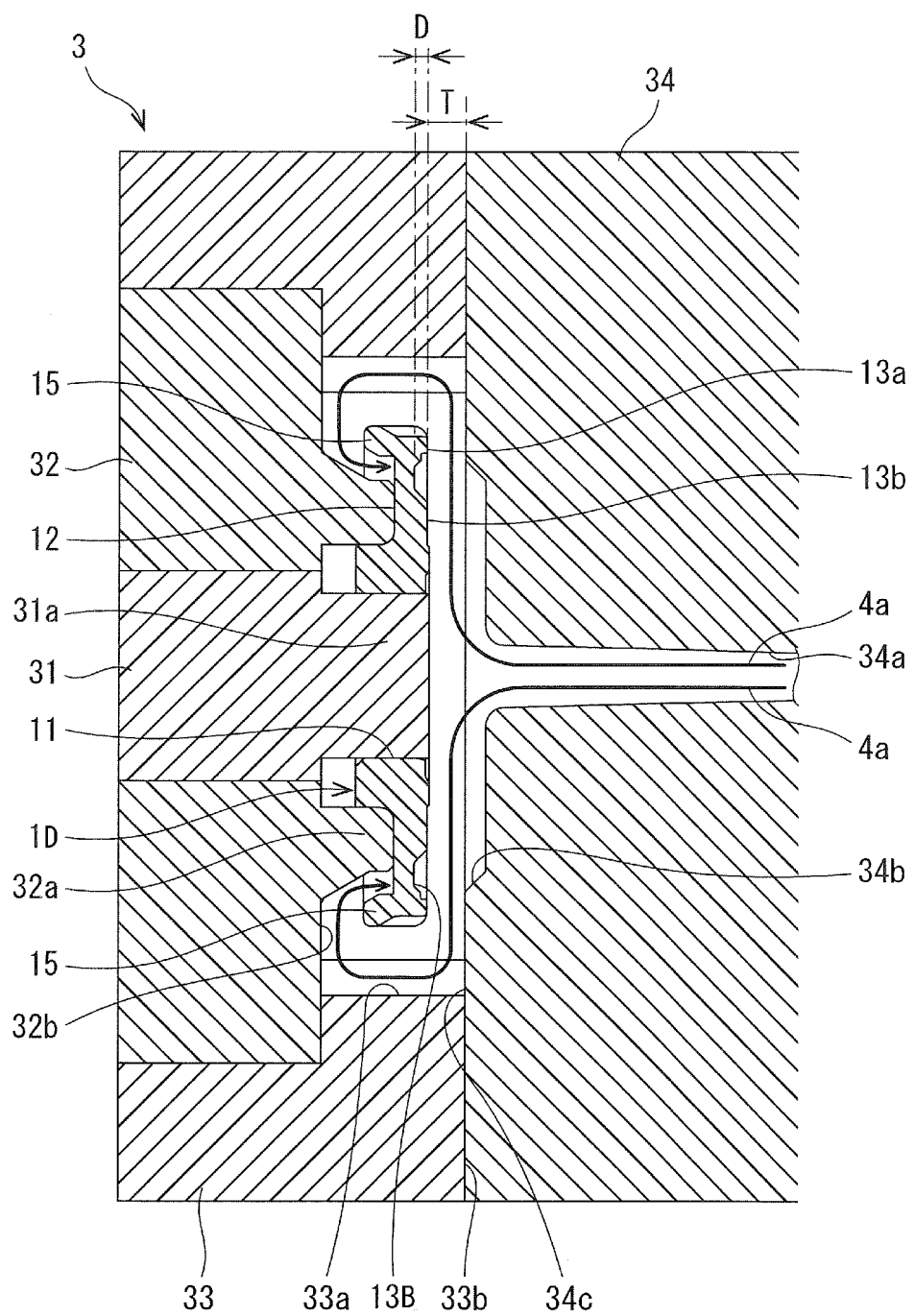
FIG. 23 is a view explaining a mold used in injection molding for manufacturing the worm wheel of the fifth embodiment, and a flow of a synthetic resin during injection molding.
Figure 24:
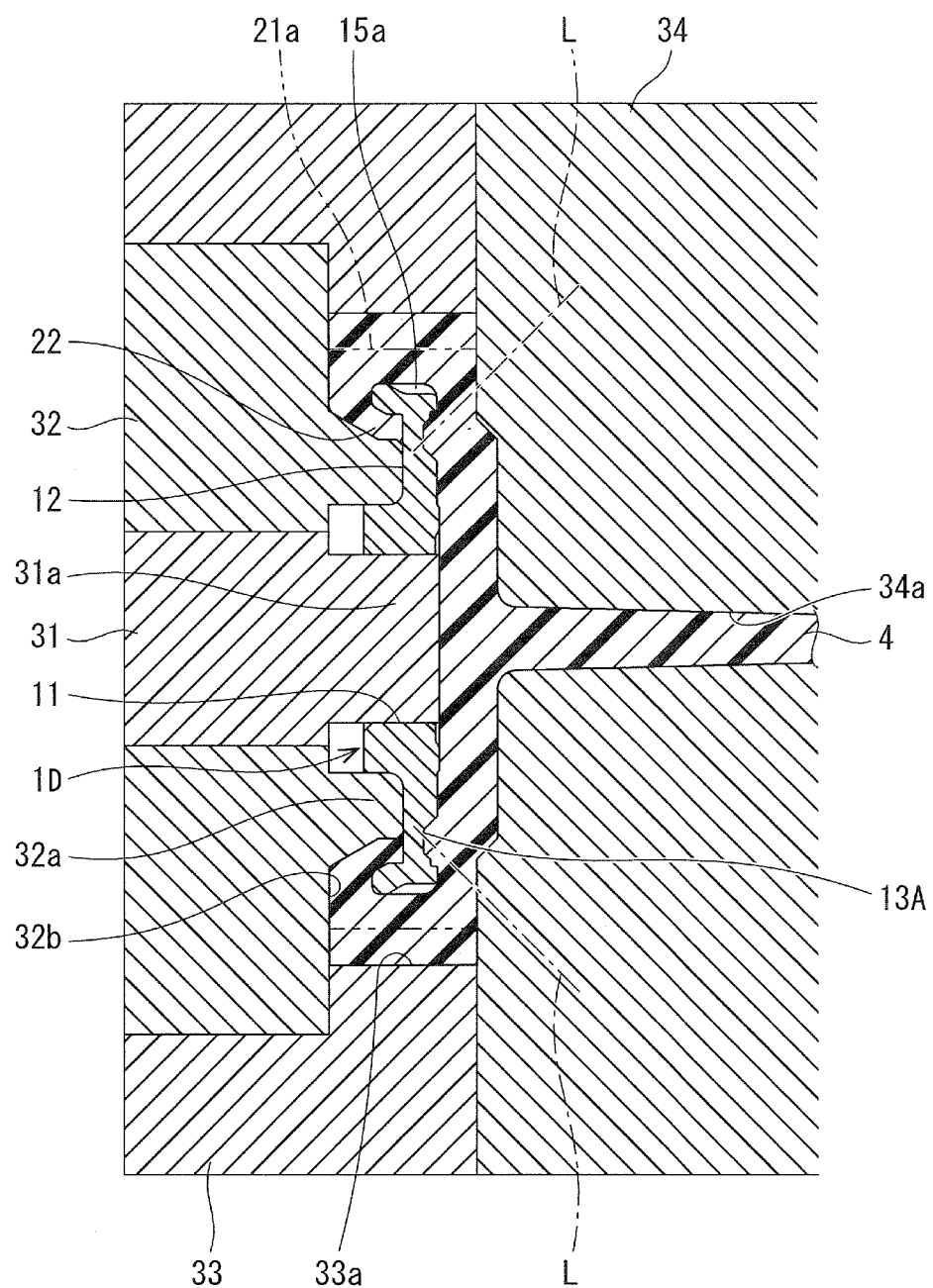
FIG. 24 is a view explaining a method of manufacturing the worm wheel of the fifth embodiment, showing a state where the synthetic resin is filled and solidified in the mold by injection molding.

The worm wheel 10D is manufactured by the same method as those of the fourth embodiment, except that a shape of the core used is different therefrom. FIG. 23 is a view corresponding to FIG. 17 in the fourth embodiment, and FIG. 24 is a view corresponding to FIG. 18 in the fourth embodiment.

In the fifth embodiment, a relationship of the depth D of the second annular recess 13B and the gate thickness T satisfies D≤T/2, the tapered surface 3Bc is formed radially inward of the third annular recess 14B, and the end surface portions 13Ba, 13Bb, between which the second annular recess 13B is disposed, are arranged on the same plane F. Therefore, a flow of the synthetic resin is hardly disturbed during injection molding of the synthetic resin. Thus, the synthetic resin is clearly expanded over the whole of the cavity (up to the first annular recess 12, which is a terminal part of the flow), thereby preventing occurrence of a weld line or the like which is a cause of decreasing in coupling strength between the core 1A and the rim portion 2D.

Figure 27:
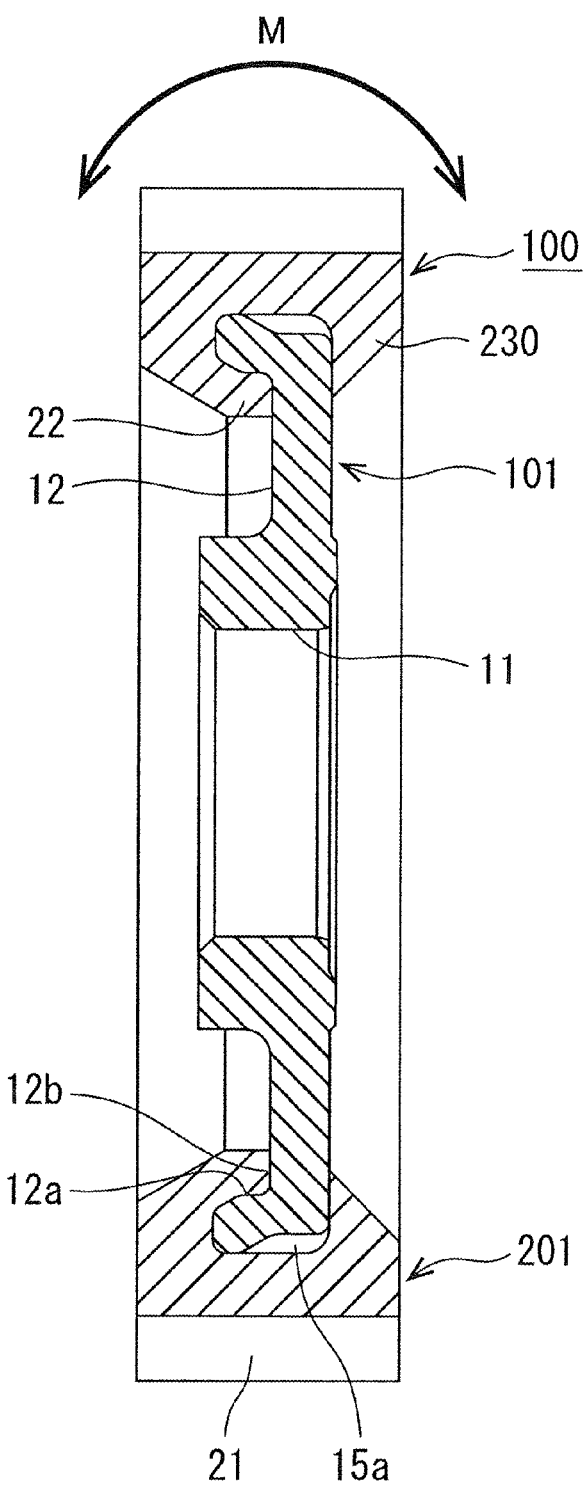
FIG. 27 is a sectional view showing a worm wheel according to the conventional example.

The worm wheel 10D includes the second annular recess 13B having the third annular recess 14B as well as the first annular recess 12 formed on the core 1D and has a fixation of the second inner circumferential portion 23B of the rim portion 2C to the second annular recess 13B, in addition to a fixation of the first inner circumferential portion 22 of the rim portion 2C to the first annular recess 12, and thus, coupling strength between the core 1D and the rim portion 2D is higher than that of a worm wheel 100 in FIG. 27.

Also, because the outer circumferential wall surface of the second annular recess 13B is formed in a shape having the third right-angled annular recess 14B on an outer diameter portion of the tapered surface Bc, the worm wheel 10C can be made to have a further increased coupling strength between the core 1D and the rim portion 2D, as compared to a configuration having a shape consisting of only a tapered surface.

The worm wheel 10D is used in a speed reducer for a worm gear mechanism of an electric power steering apparatus.

Figure 25:
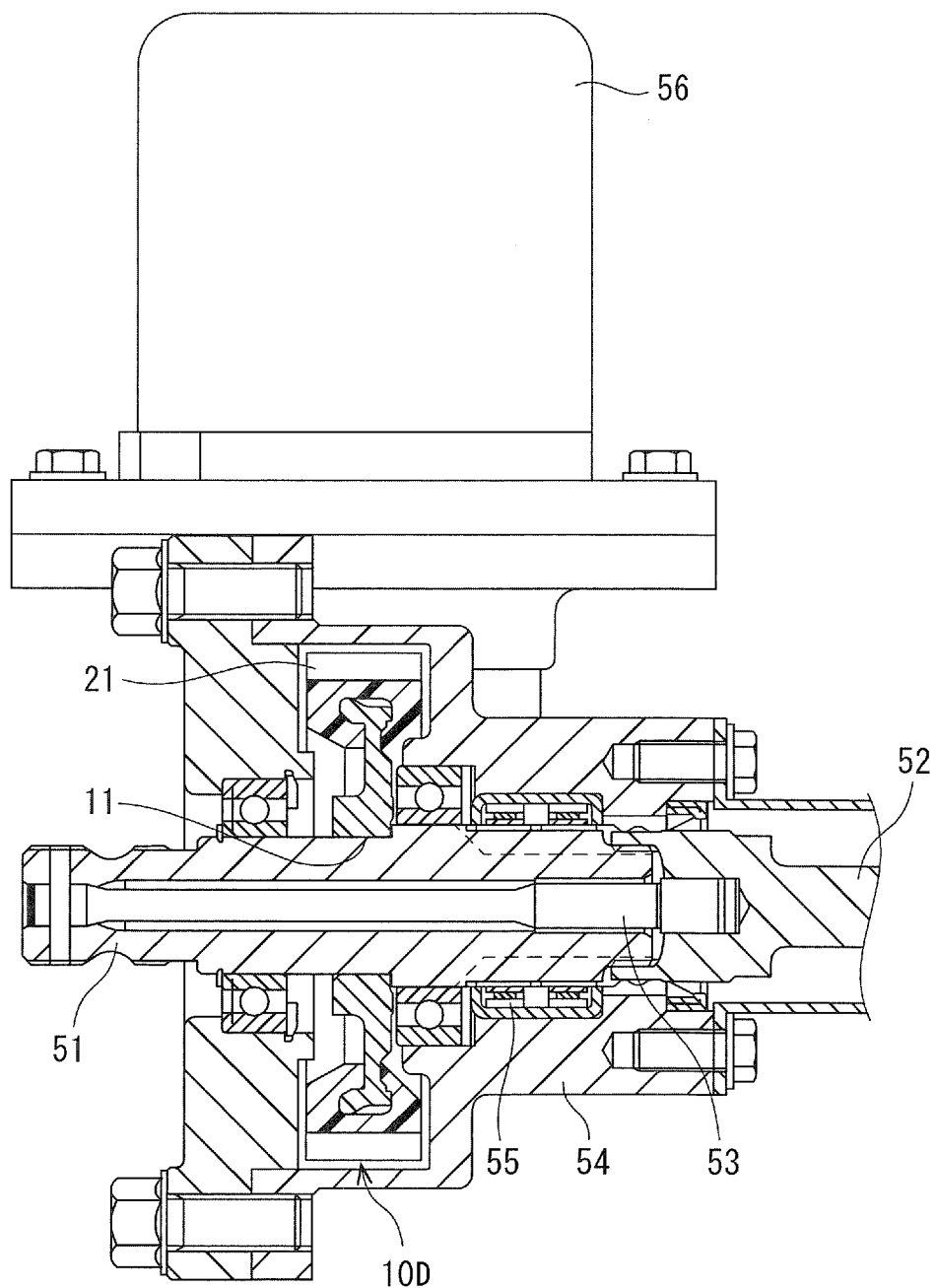
FIG. 25 is a sectional view showing a state where the worm wheel of the fifth embodiment is attached to a speed reducer for an electric power steering apparatus.
Figure 26:
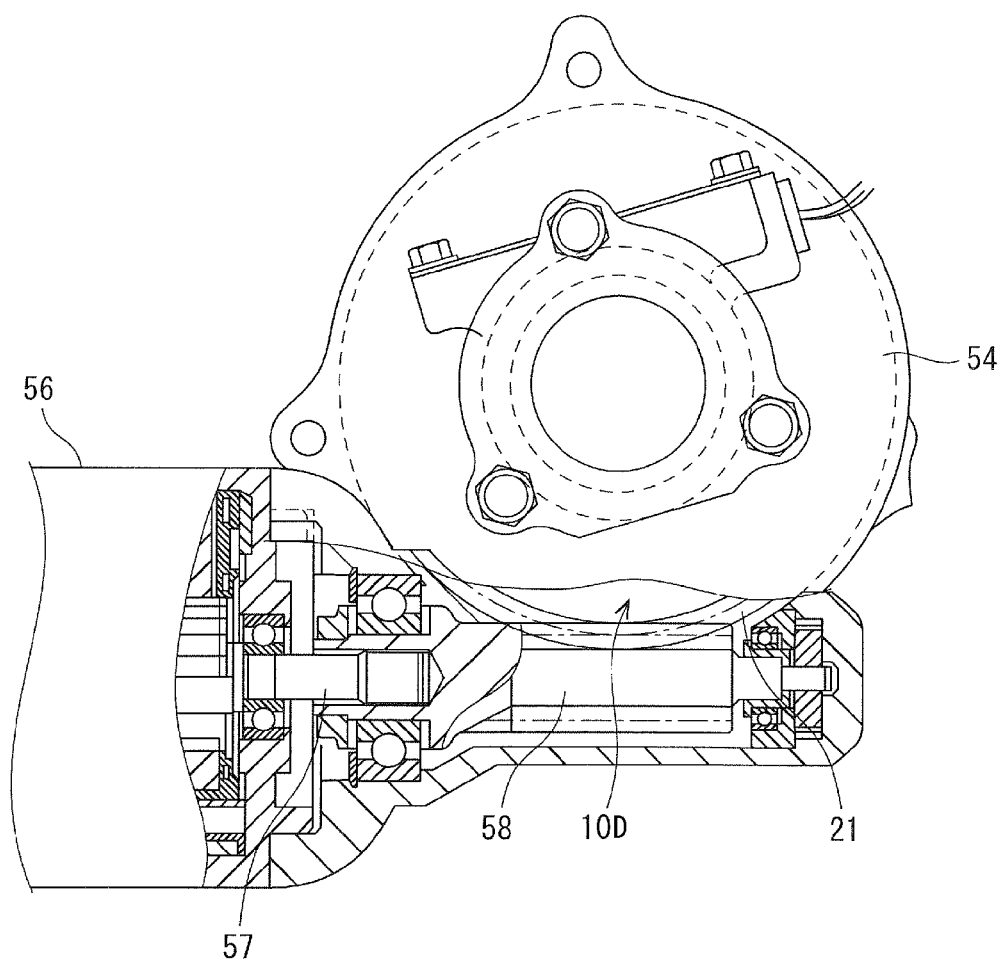
FIG. 26 is a view explaining a worm gear mechanism forming the speed reducer of FIG. 25.

FIG. 25 shows the electric power steering apparatus having the speed reducer, into which the worm wheel 10D is incorporated. FIG. 26 is a view explaining the worm gear mechanism forming the speed reducer in FIG. 25. FIG. 25 is a view corresponding to FIG. 19 in the fourth embodiment, and FIG. 24 is a view corresponding to FIG. 20 in the fourth embodiment.

The present invention is based on Japanese Patent Application No. 2013-034912 filed on Feb. 25, 2013, Japanese Patent Application No. 2013-034913 filed on Feb. 25, 2013, and Japanese Patent Application No. 2013-045857 filed on Mar. 7, 2013, the entire contents of which are incorporated herein by reference.

INDUSTRIAL APPLICABILITY

The present invention can be applied to a worm wheel forming a speed reducer for an electric power steering apparatus, in which a power of an electric motor is transmitted to a steering mechanism to assist steering.

EXPLANATION OF REFERENCE SIGNS 1, 1A, 1B, 1C, 1D Core
11 Center Hole
12 First Annular Recess
12a Outer Circumferential Wall Surface of First Annular Recess
12b Radially Outer Portion of A Bottom Surface of First Annular Recess
13, 13A, 13B Second Annular Recess
13a, 13b, 13Aa, 13Ba, 13Ab, 13Bb End Surface Portions between which Second Annular Recess is Provided
13c Outer Circumferential Wall Surface of Second Annular Recess
13Ac, 13Bc Tapered Surface of Second Annular Recess
13d, 13Ad, 13Bd Bottom Surface of Second Annular Recess
13e, 13Ae, 13Be Inner Circumferential Surface of Second Annular Recess
13Af Outer Tapered Surface
2, 2A, 2B, 2C, 2D Rim Portion
21 Gear
22 First Inner Circumferential Portion
23, 23A, 23B Second Inner Circumferential Portion
34a Sprue
34b Recessed Portion Forming Disk Gate
10, 10A, 10B, 10C, 10D Worm Wheel
51 Output Shaft of Electric Power Steering Apparatus (Steering Mechanism)
52 Steering Shaft (Steering Mechanism)
56 Electric Motor
D Depth of Second Annular Recess
T Gate Thickness

The invention claimed is:
1. A worm wheel comprising:
a disk-shaped core made of metal; and
an annular rim portion made of synthetic resin and covering an outer circumferential portion of the core;
wherein a gear is formed on an outer circumferential portion of the rim portion,
wherein the rim portion is integrally formed with the core by synthetic resin injection molding, wherein the core comprises a center hole into which a shaft is fitted, an axial end surface formed with a first annular recess, and another axial end surface formed with a second annular recess, wherein the first annular recess is formed at a radially inner side with respect to the outer circumferential portion of the core and is recessed toward an axially inner side with respect to the axial end surface of the outer circumferential portion of the core, and the second annular recess is formed at a radially inner side with respect to the outer circumferential portion of the core and is recessed toward an axially inner side with respect to the other axial end surface of the outer circumferential portion of the core, wherein an outer circumferential wall surface of a radially outer region of the second annular recess comprises a tapered surface extending from a bottom surface of the second annular recess to form an obtuse angle relative to the bottom surface, and a third annular recess formed radially outside the tapered surface, a cross-sectional shape of the third annular recess being a right-angled triangle having, as two sides of the triangle, a surface parallel to the bottom surface of the second annular recess and a surface perpendicular to the bottom surface of the second annular recess, wherein the rim portion comprises a first inner circumference extending from an axial end surface of the rim portion to a radially outer region of the first annular recess and fixed to the radially outer region of the first annular recess, and a second inner circumference extending from another axial end surface of the rim portion to the radially outer region of the second annular recess and fixed to the radially outer region of the second annular recess, wherein the rim portion is injection-molded in a state in which the core is arranged in a mold such that the second annular recess faces a gate and such that an axial direction of a sprue and an axial direction of the core are aligned with each other, and wherein the outer circumferential wall surface of the second annular recess further comprises an outer tapered surface formed radially outside the third annular recess, wherein the tapered surface and the outer tapered surface are arranged on a same line.

2. The worm wheel according to claim 1, wherein the surface of the third annular recess that is perpendicular to the bottom surface of the second annular recess extends to reach the other axial end surface of the core.

3. The worm wheel according to claim 1, wherein the other axial end surface of the core comprises end surface portions between which, in a radial direction, the second annular recess is disposed, and wherein each of the end surface portions is a flat surface.

4. The worm wheel according to claim 3, wherein the flat surfaces forming the respective end surface portions are arranged on a same plane.

5. The worm wheel according to claim 1, wherein the gate is a disk gate and the rim portion is injection molded using the disk gate.

6. An electric power steering apparatus comprising:
a speed reducer comprising the worm wheel according to claim 1;
an electric motor; and
a steering mechanism,
wherein the electric motor assists steering by transmitting power of the electric motor to the steering mechanism through the speed reducer.

7. A worm wheel comprising:
a disk-shaped core made of metal; and
an annular rim portion made of synthetic resin and covering an outer circumferential portion of the core;
wherein a gear is formed on an outer circumferential portion of the rim portion,
wherein the rim portion is integrally formed with the core by synthetic resin injection molding,
wherein the core comprises a center hole into which a shaft is fitted, an axial end surface formed with a first annular recess, and another axial end surface formed with a second annular recess,
wherein an outer circumferential wall surface of a radially outer region of the second annular recess comprises a tapered surface extending from a bottom surface of the second annular recess to form an obtuse angle relative to the bottom surface, and a third annular recess formed radially outside the tapered surface, a cross-sectional shape of the third annular recess being a right-angled triangle having, as two sides of the triangle, a surface parallel to the bottom surface of the second annular recess and a surface perpendicular to the bottom surface of the second annular recess,
wherein the rim portion comprises a first inner circumference extending from an axial end surface of the rim portion to a radially outer region of the first annular recess and fixed to the radially outer region of the first annular recess, and a second inner circumference extending from another axial end surface of the rim portion to the radially outer region of the second annular recess and fixed to the radially outer region of the second annular recess,
wherein the rim portion is injection-molded in a state in which the core is arranged in a mold such that the second annular recess faces a gate and such that an axial direction of a sprue and an axial direction of the core are aligned with each other, and
wherein the outer circumferential wall surface of the second annular recess further comprises an outer tapered surface formed radially outside the third annular recess, wherein the tapered surface and the outer tapered surface are arranged on a same line.

* * * * *